(12) United States Patent
Shapiro

(10) Patent No.: US 6,893,030 B2
(45) Date of Patent: May 17, 2005

(54) COMPACT WAGON OR CART INCLUDING STOWABLE WHEELS AND HANDLE

(76) Inventor: Richard N. Shapiro, 2248 Haversham Close, Virginia Beach, VA (US) 23464

( * ) Notice: Subject to any disclaimer, the term of this patent is extended or adjusted under 35 U.S.C. 154(b) by 189 days.

(21) Appl. No.: 10/157,980

(22) Filed: May 31, 2002

(65) Prior Publication Data

US 2002/0140190 A1 Oct. 3, 2002

Related U.S. Application Data

(63) Continuation-in-part of application No. 09/604,769, filed on Jun. 28, 2000, now Pat. No. 6,581,945.

(51) Int. Cl.[7] .............................................. B62B 3/02
(52) U.S. Cl. .................................. 280/47.34; 280/651
(58) Field of Search .................. 280/47.19, 47.26, 280/47.37, 47.371, 35, 30, 37, 40, 651, 655, 655.1, 79.2, 79.4, 646, 47.35, 47.315, 47.11, 47.18, 87.01, 87.05

(56) References Cited

U.S. PATENT DOCUMENTS

| | | | | |
|---|---|---|---|---|
| 263,026 A | * | 8/1882 | Crandall ..................... 280/642 |
| 663,526 A | * | 12/1900 | White ....................... 280/87.01 |
| 832,628 A | * | 10/1906 | Schreffler .................... 280/652 |
| 836,505 A | * | 11/1906 | Kalli ......................... 280/644 |
| 987,895 A | * | 3/1911 | Long .......................... 280/37 |
| 1,017,983 A | * | 2/1912 | Long .......................... 280/37 |
| 1,024,176 A | * | 4/1912 | Boyens ........................ 280/37 |
| 1,075,372 A | * | 10/1913 | Overshiner ................... 280/37 |
| 1,076,087 A | * | 10/1913 | Wannenwetsch ............. 280/37 |
| 1,090,950 A | * | 3/1914 | Spofford et al. ............ 280/644 |
| 1,125,441 A | * | 1/1915 | Bailey ........................ 280/37 |
| 1,131,559 A | * | 3/1915 | Schrek ........................ 280/37 |
| 1,403,261 A | * | 1/1922 | Lynn ....................... 280/47.26 |
| 1,582,045 A | * | 4/1926 | Don Howe ............... 280/655.1 |
| 2,350,062 A | | 5/1944 | Mosier | |
| 2,362,186 A | * | 11/1944 | Brantz ........................ 280/650 |
| 2,429,763 A | * | 10/1947 | Lindabury ................... 280/38 |
| 2,450,373 A | * | 9/1948 | Fiene ......................... 280/649 |
| 2,472,491 A | * | 6/1949 | Quinton ...................... 280/37 |
| 2,545,336 A | * | 3/1951 | Binder ....................... 280/650 |
| 2,555,767 A | * | 6/1951 | Simonian ...................... 220/6 |
| 2,564,266 A | * | 8/1951 | Linton ........................ 280/37 |
| 2,625,407 A | * | 1/1953 | Varner ....................... 280/643 |
| 2,634,791 A | * | 4/1953 | Weirich ..................... 280/7.1 |
| 2,688,493 A | * | 9/1954 | Rosenberg ................. 280/651 |
| 2,781,225 A | * | 2/1957 | Heideman ................... 280/642 |
| 2,860,890 A | * | 11/1958 | Oxford et al. ............. 280/226.1 |
| 2,879,072 A | * | 3/1959 | Rear et al. .................. 280/40 |
| 2,901,260 A | * | 8/1959 | Lear et al. .................. 280/29 |
| 2,984,499 A | | 5/1961 | Humphrey | |
| 3,079,162 A | * | 2/1963 | Michels, Jr. ................ 280/7.1 |
| 3,241,853 A | * | 3/1966 | Pasin ....................... 280/87.01 |
| 3,679,223 A | * | 7/1972 | Sakal .......................... 280/37 |
| 3,883,149 A | * | 5/1975 | Perego ....................... 280/649 |
| 3,944,241 A | * | 3/1976 | Epelbaum ................... 280/30 |
| 4,109,926 A | | 8/1978 | Lane | |

(Continued)

*Primary Examiner*—Christopher P. Ellis
*Assistant Examiner*—Bridget Avery

(57) ABSTRACT

Compact carrier devices with stub walls, including wagons, carts and wheelbarrows, are disclosed, which include fixed, stowable and/or pivoting wheels, as well as stowable handles. In various embodiments, simple manually manipulable methods latch each wheel and handle in stowed flat positions within the overall perimeter and profile of the devices, which effectively allows the devices to fold to an ultra flat profile without any wheel or component being detached. Associated innovations include unique nesting methods, both unique center push/pull handles and U shaped handle designs, unique handle access panels, device couplers, simple methods to fixate or allow device wheels/ axles to rotate, as well as snap on accessories which are designed to hold drink containers, fishing rods and implements.

62 Claims, 14 Drawing Sheets

U.S. PATENT DOCUMENTS

| | | | | |
|---|---|---|---|---|
| 4,174,120 A | * | 11/1979 | Freeman | 280/204 |
| 4,355,818 A | * | 10/1982 | Watts | 280/654 |
| 4,369,987 A | * | 1/1983 | Witherell | 280/644 |
| 4,487,428 A | * | 12/1984 | Harada et al. | 280/648 |
| 4,623,163 A | * | 11/1986 | Potts | 280/649 |
| D287,779 S | * | 1/1987 | Slany | D34/25 |
| 4,705,280 A | * | 11/1987 | Burns | 280/40 |
| 4,744,575 A | * | 5/1988 | Tonelli | 280/87.01 |
| 4,765,643 A | | 8/1988 | Pappanikolaou | |
| 4,779,889 A | * | 10/1988 | Morrison | 280/475 |
| 4,796,909 A | * | 1/1989 | Kirkendall | 180/906 |
| 4,824,137 A | * | 4/1989 | Bolden | 280/652 |
| 4,856,810 A | | 8/1989 | Smith | |
| 4,887,836 A | | 12/1989 | Simjian | |
| 4,889,360 A | | 12/1989 | Havlovitz | |
| 4,969,656 A | * | 11/1990 | Clausen | 280/47.38 |
| 5,028,060 A | * | 7/1991 | Martin | 280/39 |
| 5,125,674 A | * | 6/1992 | Manuszak | 280/30 |
| 5,203,815 A | * | 4/1993 | Miller | 43/21.2 |
| 5,228,706 A | * | 7/1993 | Boville | 280/43.22 |
| 5,299,826 A | * | 4/1994 | Flowers | 280/651 |
| 5,306,029 A | * | 4/1994 | Kaiser, II | 280/30 |
| 5,330,212 A | * | 7/1994 | Gardner | 280/40 |
| 5,373,708 A | * | 12/1994 | Dumoulin, Jr. | 62/457.7 |
| 5,460,391 A | * | 10/1995 | Gantz et al. | 280/30 |
| 5,465,985 A | * | 11/1995 | Devan et al. | 280/30 |
| 5,484,046 A | * | 1/1996 | Alper et al. | 190/115 |
| 5,538,267 A | * | 7/1996 | Pasin et al. | 280/47.35 |
| 5,636,852 A | * | 6/1997 | Sistrunk et al. | 248/156 |
| 5,653,458 A | * | 8/1997 | Chaparian | 280/30 |
| 5,660,296 A | * | 8/1997 | Greenwich | 220/326 |
| 5,692,761 A | | 12/1997 | Havlovitz | |
| 5,741,020 A | * | 4/1998 | Harroun | 280/42 |
| 5,839,738 A | * | 11/1998 | Ozark | 280/30 |
| 5,839,748 A | * | 11/1998 | Cohen | 280/648 |
| 5,857,695 A | * | 1/1999 | Crowell | 280/651 |
| 5,876,049 A | * | 3/1999 | Spear et al. | 280/33.998 |
| 5,887,879 A | * | 3/1999 | Chumley | 280/40 |
| 5,897,462 A | * | 4/1999 | St. Germain | 297/18 |
| 5,947,493 A | * | 9/1999 | Pasin et al. | 280/47.34 |
| 6,170,837 B1 | * | 1/2001 | Ross | 280/1 |
| 6,220,611 B1 | * | 4/2001 | Shapiro | 280/47.34 |
| D448,536 S | | 9/2001 | Treschitta | D34/23 |
| 6,431,580 B1 | * | 8/2002 | Kady | 280/655 |
| 6,446,981 B1 | * | 9/2002 | Wise et al. | 280/7.17 |

\* cited by examiner

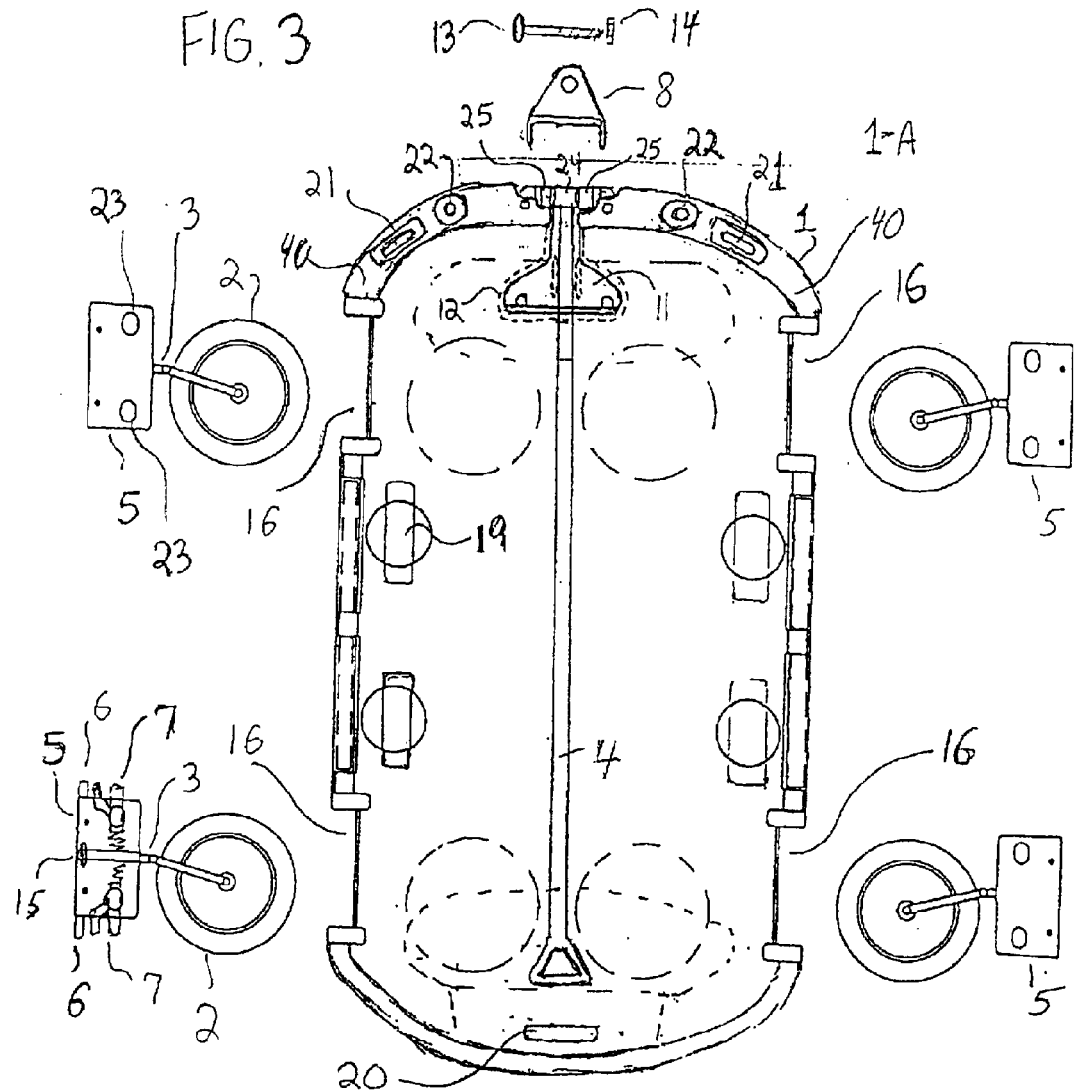
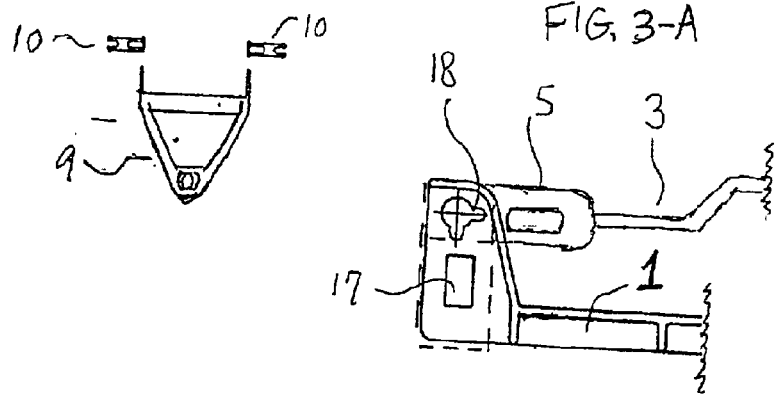
FIG. 3
FIG. 3-A

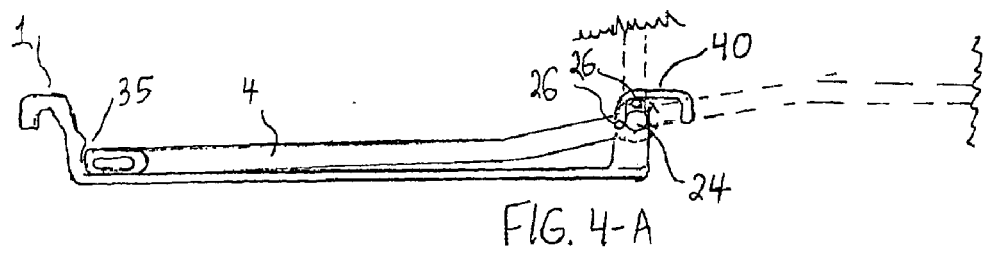
FIG. 4-A
FIG. 4
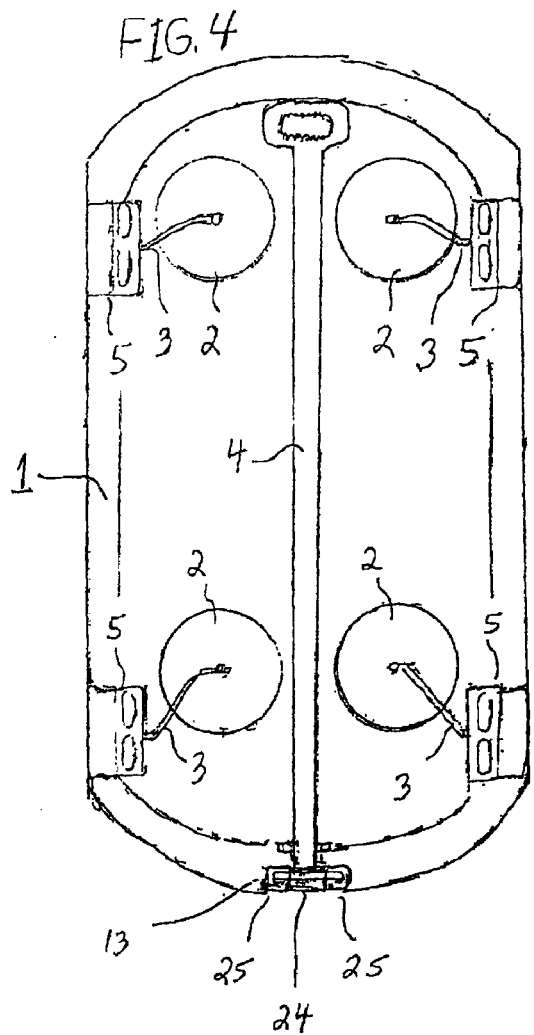
FIG. 5
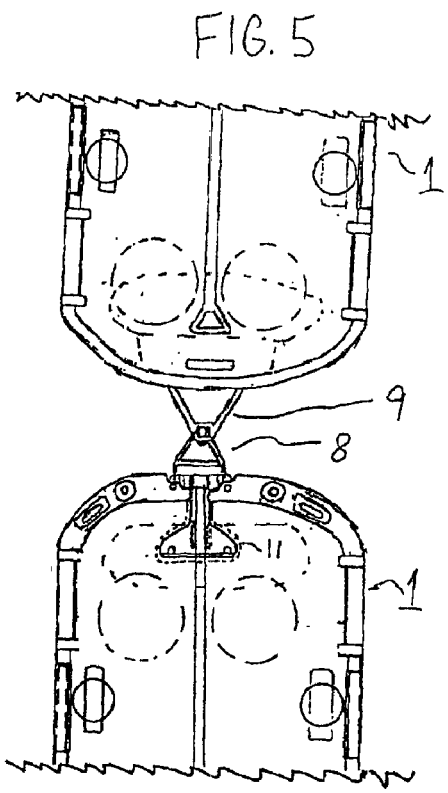
FIG. 5-A
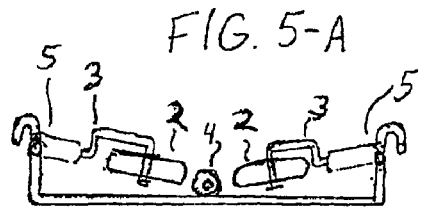

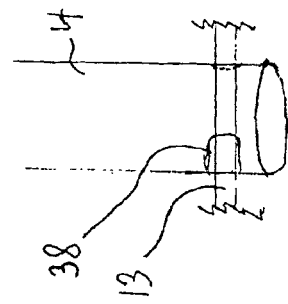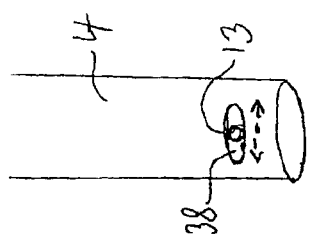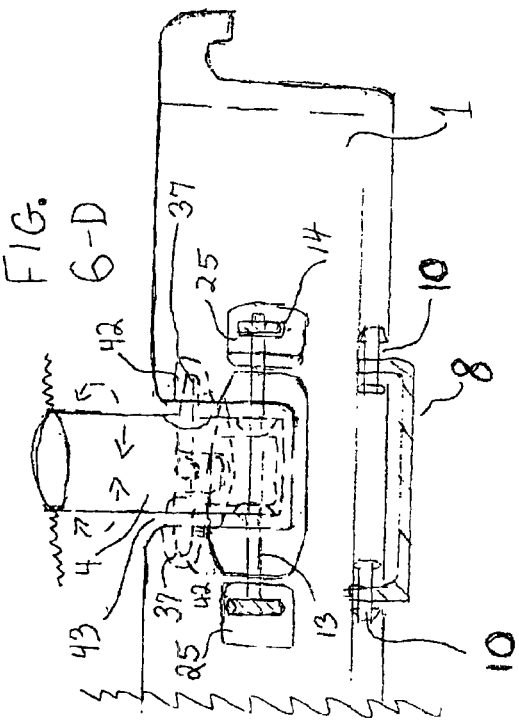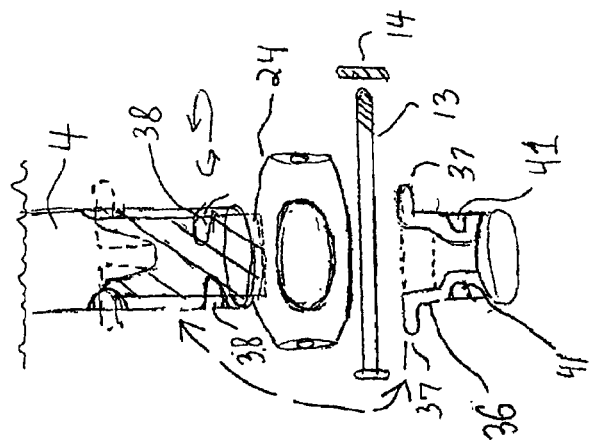

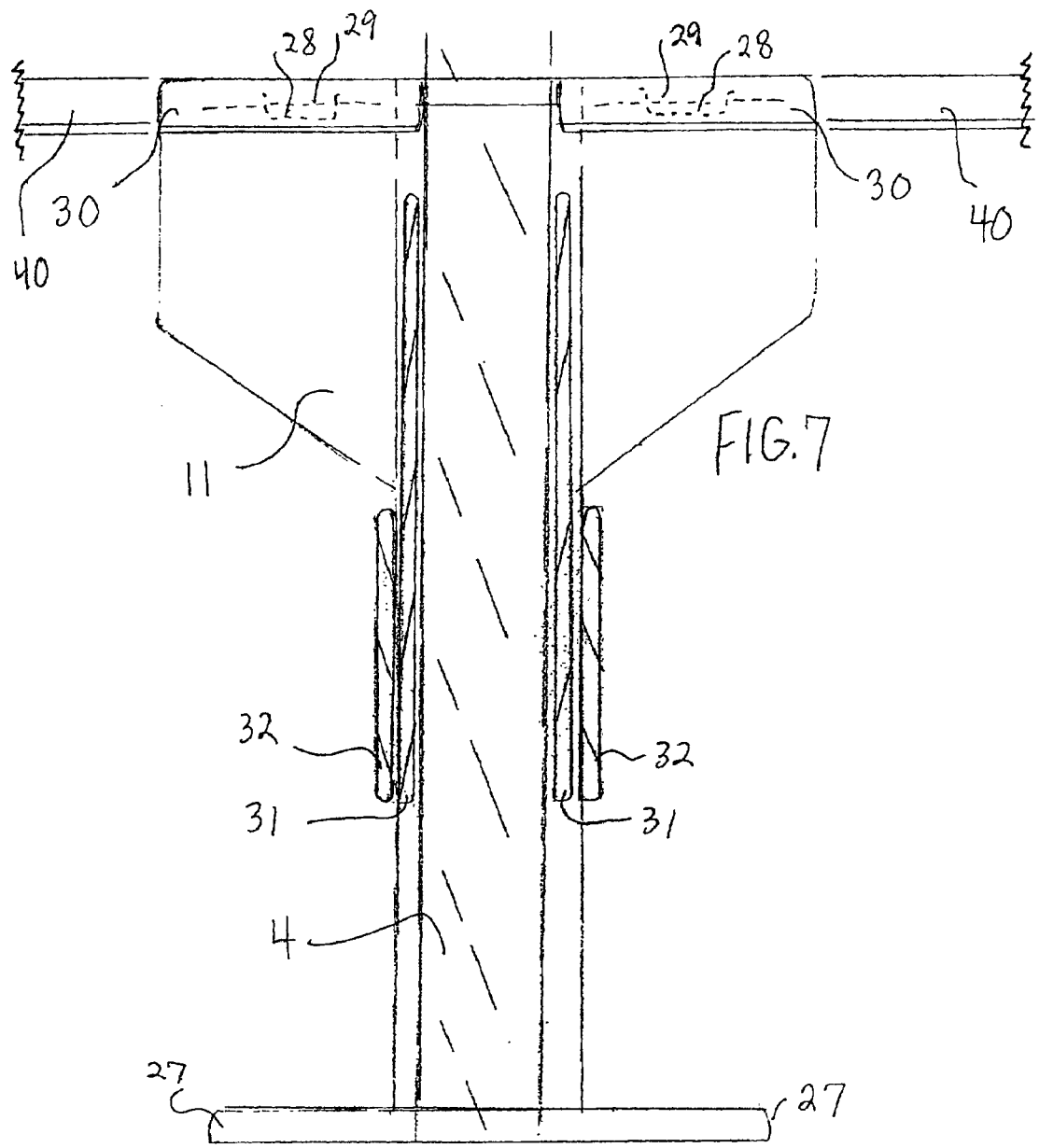

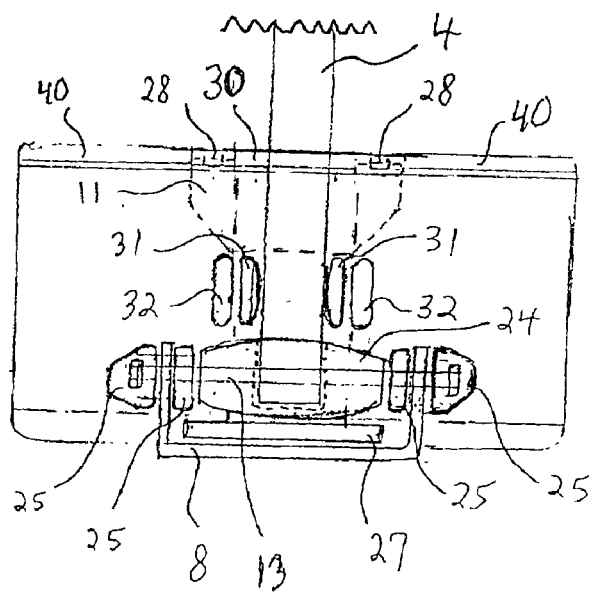
FIG. 8
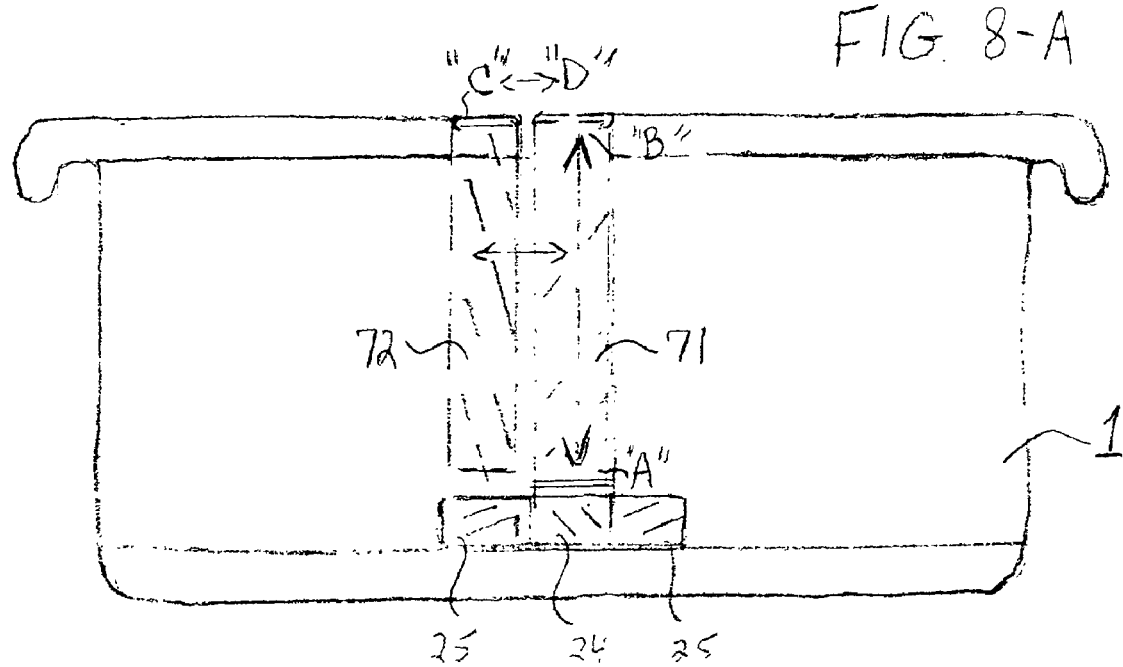
FIG. 8-A

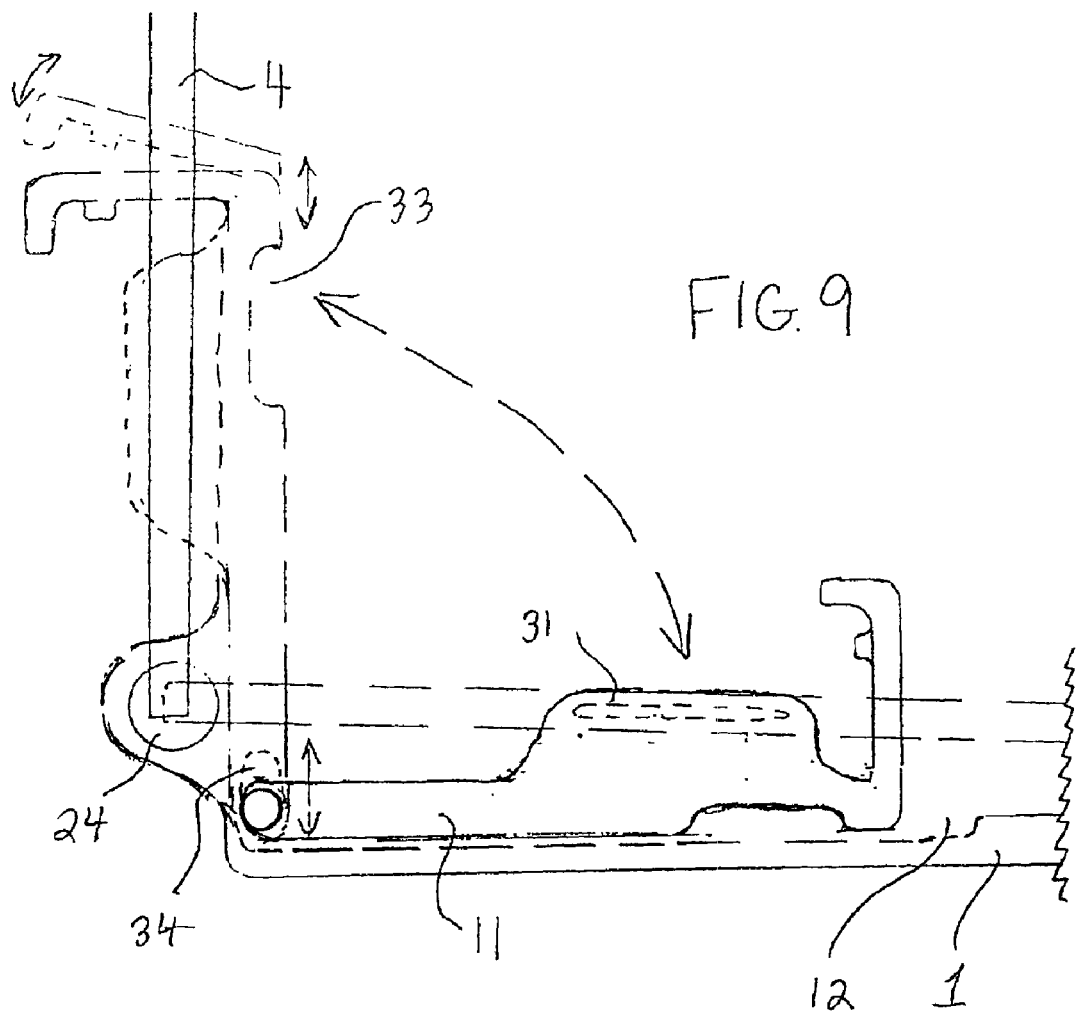

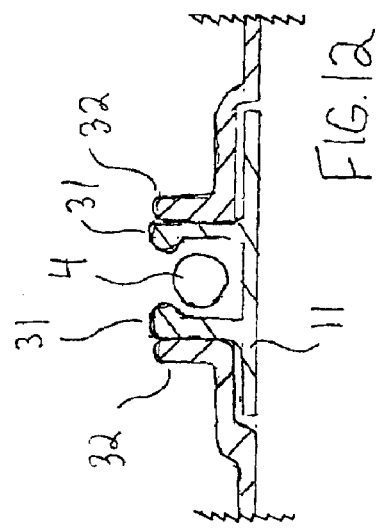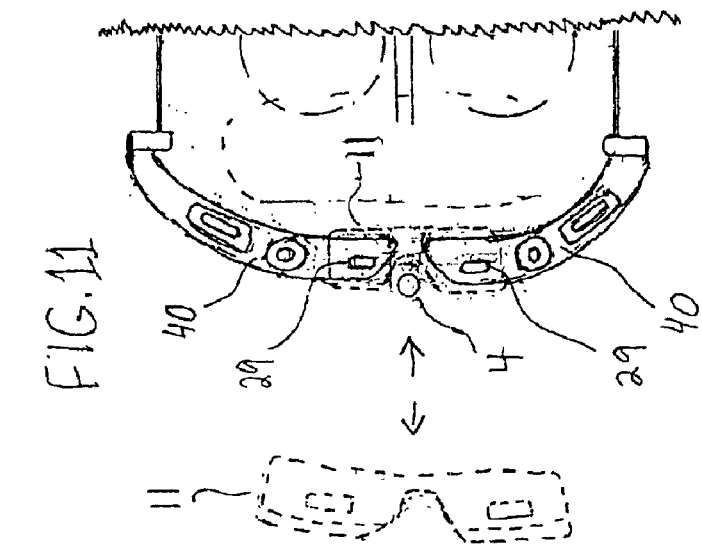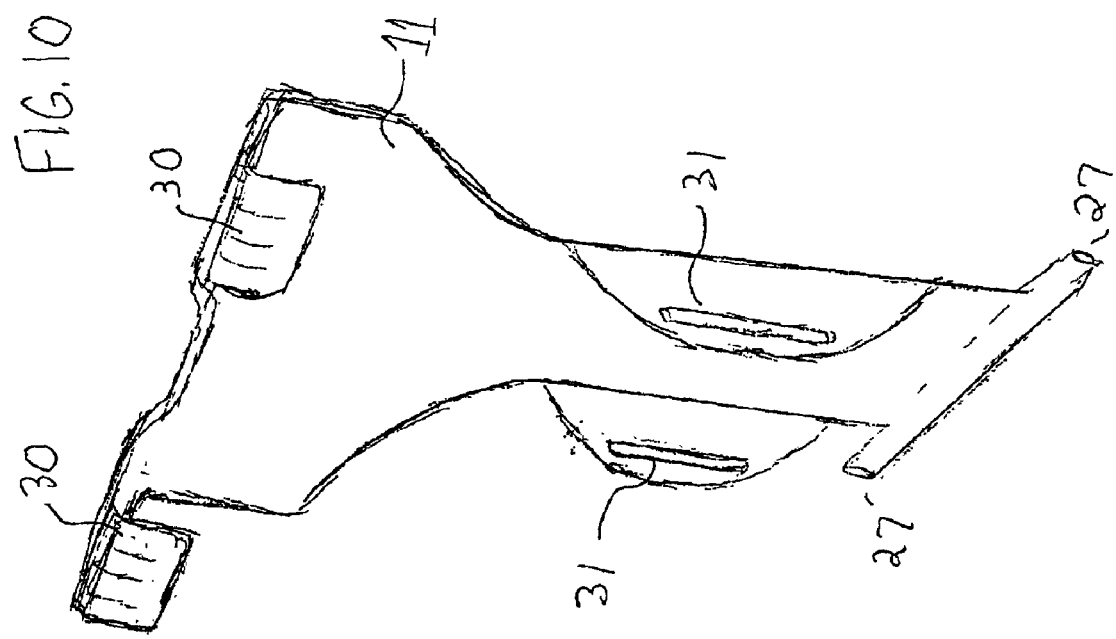

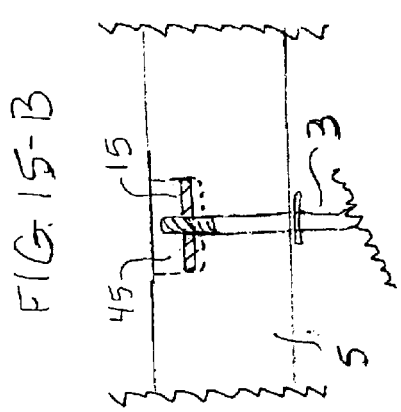
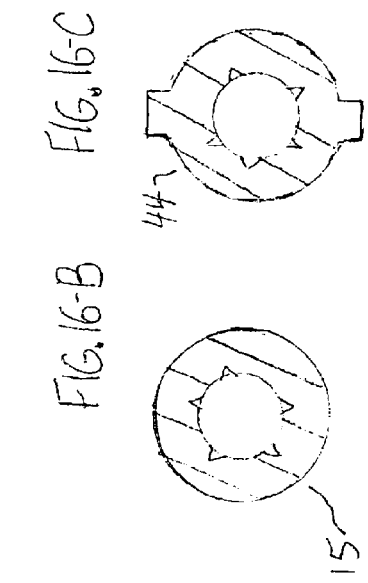
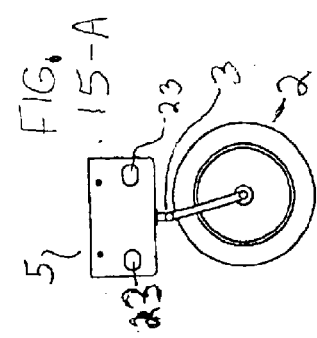
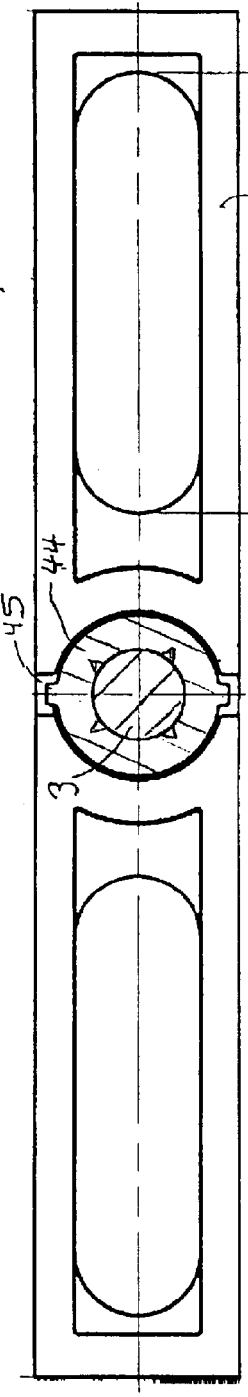
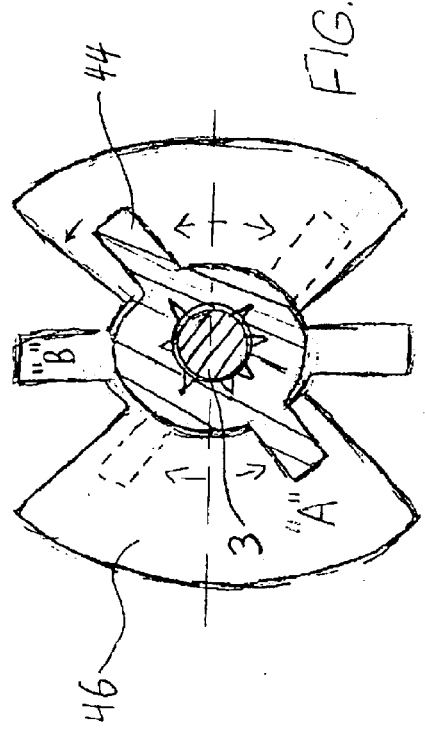

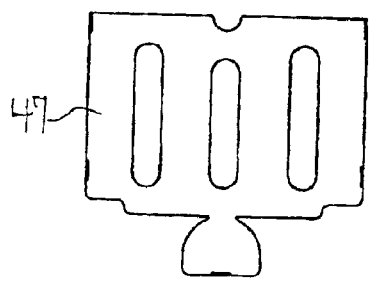
FIG. 17-A
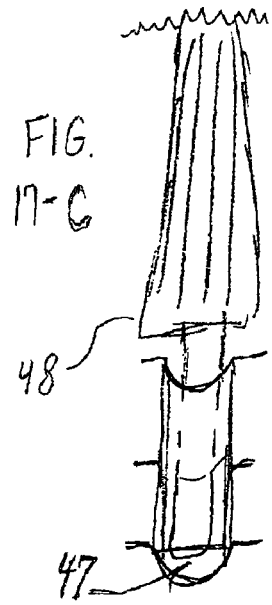
FIG. 17-C
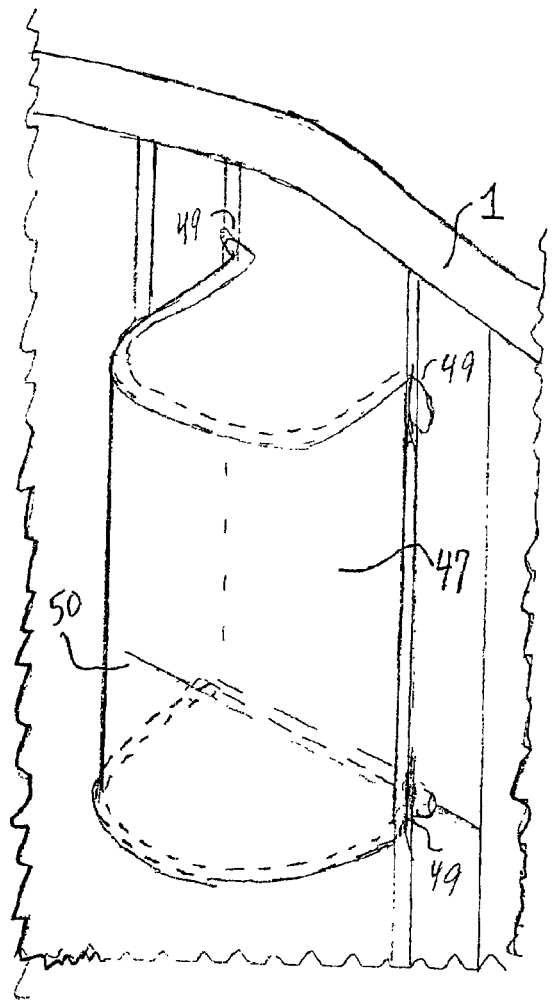
FIG. 17-B

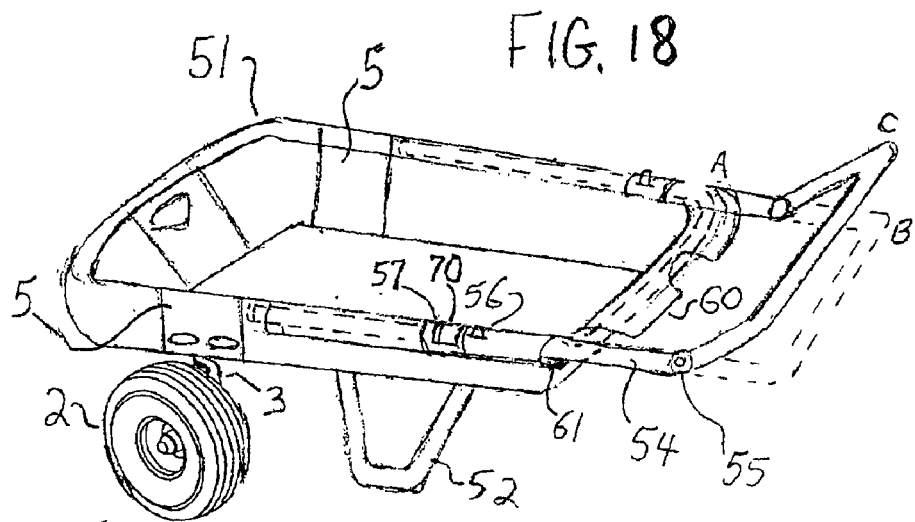
FIG. 18
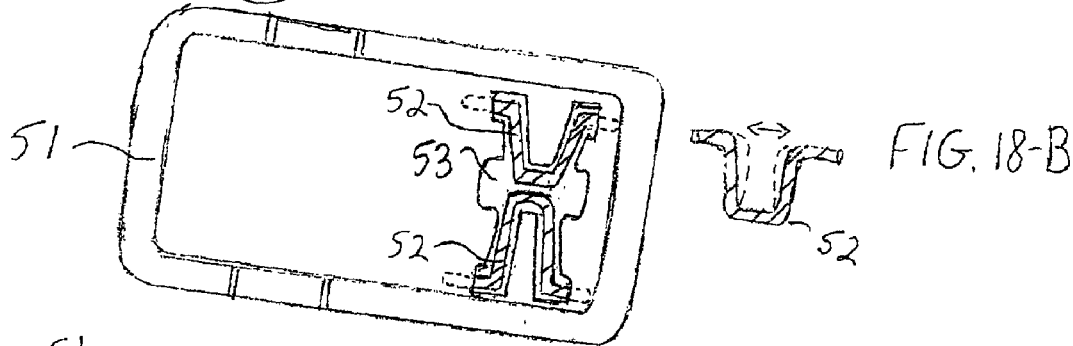
FIG. 18-B
FIG. 18-C
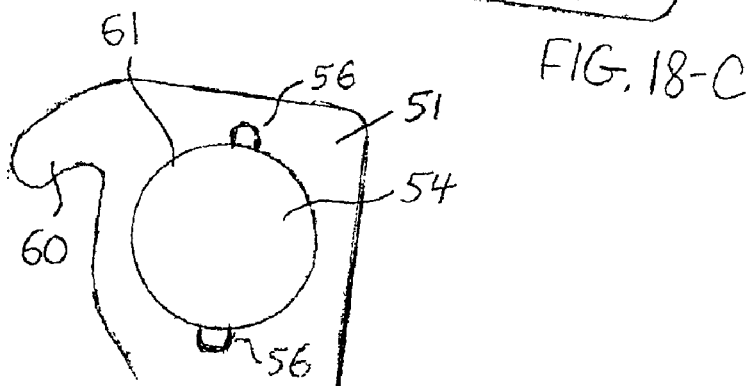
FIG. 18-D
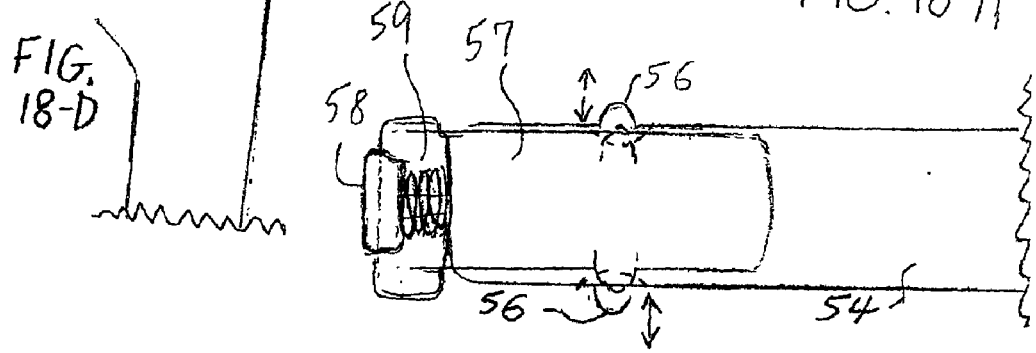
FIG. 18-A

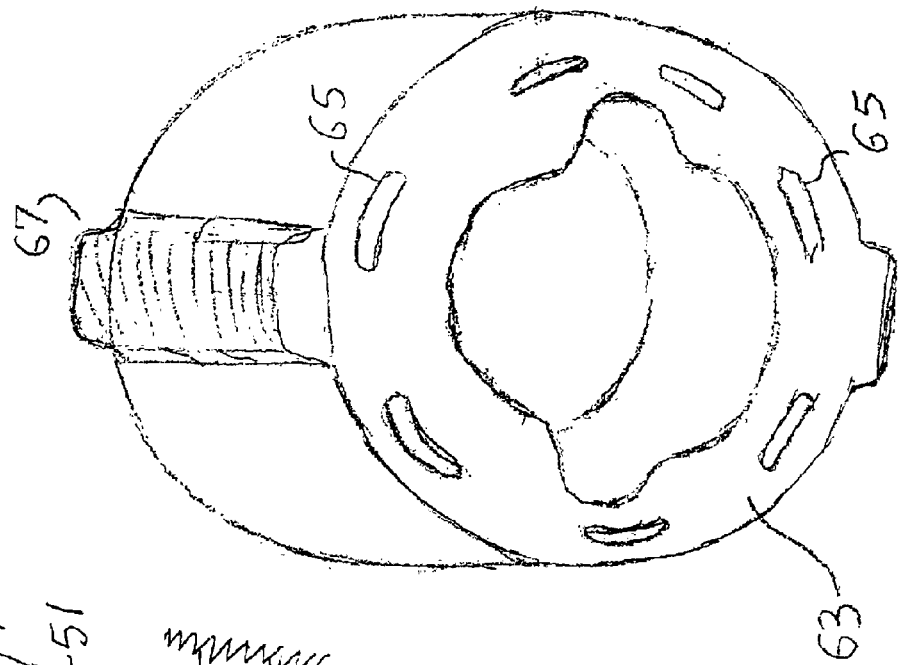
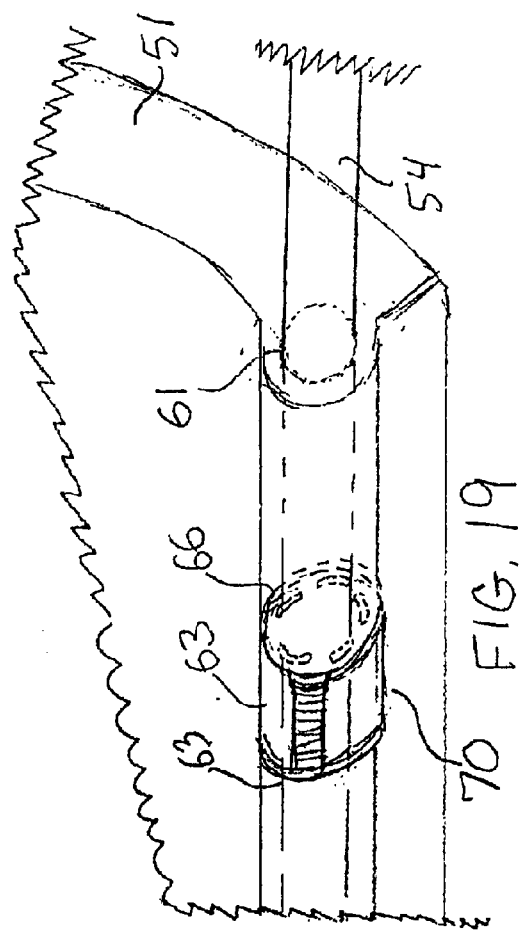
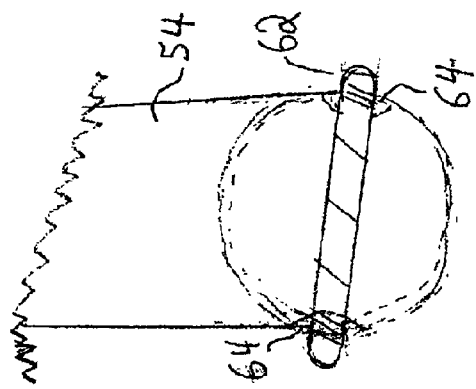

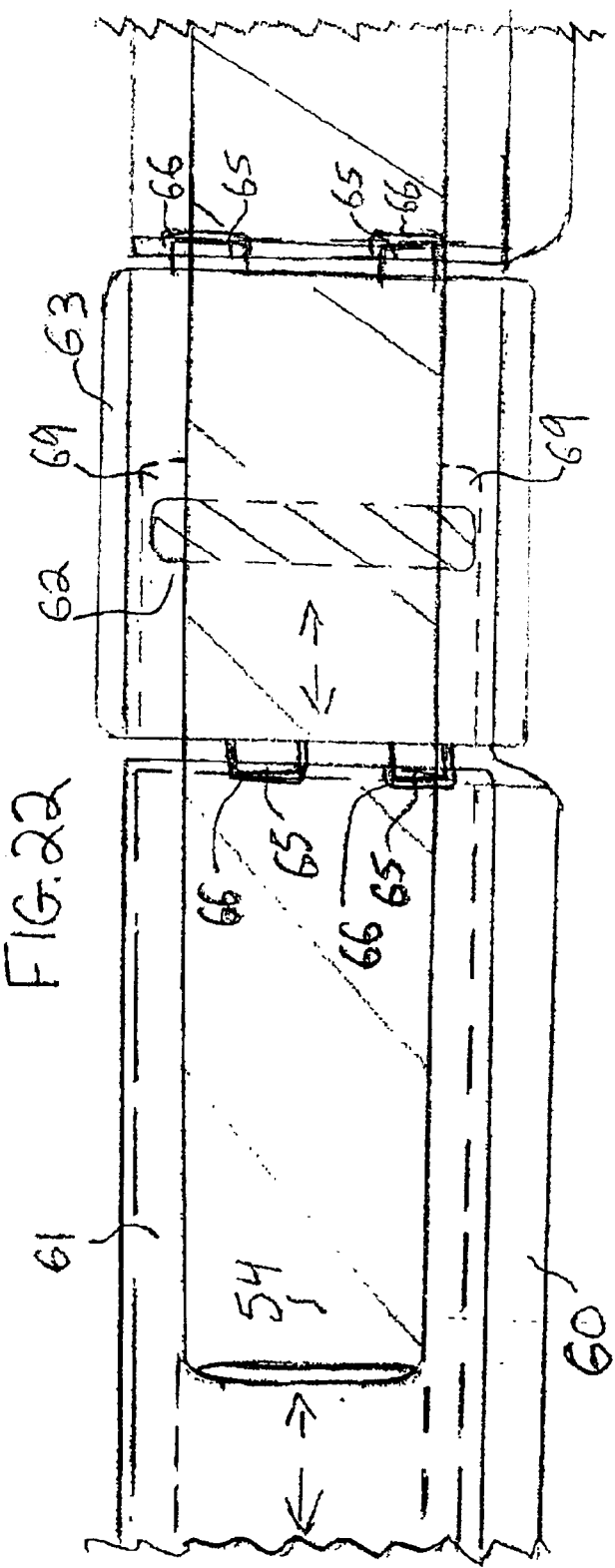
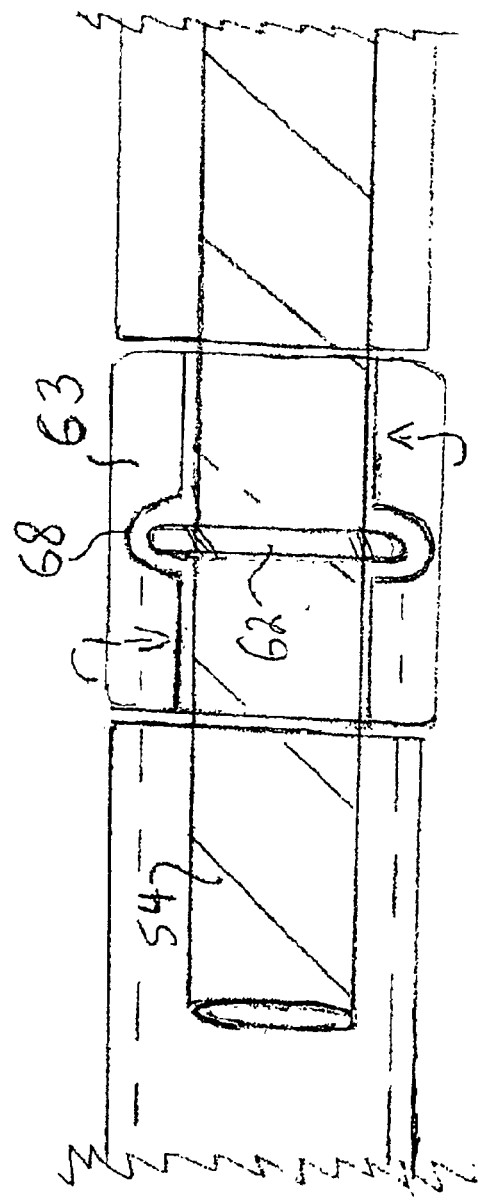

COMPACT WAGON OR CART INCLUDING STOWABLE WHEELS AND HANDLE

RELATIONSHIP TO ALL OTHER APPLICATIONS

This application is a continuation in part of U.S. patent application Ser. No. 09/604,769 filed on Jun. 28, 2000 filed U.S. Pat. No. 6,581,945.

Other related applications include Shapiro's previous U.S. application Ser. No. 09/271,274, filed on Mar. 17, 1999, U.S. Pat. No. 6,220,611, granted Apr. 24, 2001.

FIELD OF THE INVENTION

The present invention relates to carrier devices including wagons, carts, and wheelbarrows, and methods to stow or pivot wheels, and all component parts, and otherwise create ultra-thin stowed profiles for such wagon and cart devices.

BACKGROUND OF THE INVENTION

In U.S. Pat. No. 6,220,611, granted Apr. 24, 2001, the applicant, Shapiro, disclosed unique methods relating to pivoting and stowable wheel axle assemblies for wagons and carts, and related innovations. Improvements were further disclosed in the continuation-in-part U.S. patent application Ser. No. 09/604,769, above referenced. This application provides further refinements and enhancements to compact carrier and wagon devices, which may be adapted on wheeled carts as well. Many of the enhancements here relate to wagons or carts with a base incorporating formed stub walls, with pivoting or stowable wheels and handles.

It is one object of this invention to provide for innovations relating to methods to stow wheels and handles on wagons and carts, and the means by which these wheels and handles may be mounted to such wagons and carts in simple and convenient fashion.

It is another object of the invention to provide for convenient nesting and stowing of cart or wagon devices whereby they may be nested in unique and convenient fashion.

It is another object of the invention to provide for several unique embodiments of stub wall access panels which have features relating to the stowable handle, which access panels have various innovative features, including retention protrusions to hold a stowable handle in various positions, whether intermediate or stowed positions. Also, the access panel may pivot, or may slide upward or laterally.

It is another object of the invention to provide for unique stowable couplers whereby two or more wagons may be coupled and a user may pull the coupled devices with a single handle. Also one of the couplers may double as a wall hook receiving device.

It is another object of the invention to provide for unique methods to provide that a wagon or cart handle may be retained at one or more intermediate positions and very simply rotated, moved, or pressed through retention protrusions so that the same handle may stow within the compact wagon device.

It is another object of the invention to provide that a handle for a wagon or a cart device may be mounted just forward of the stub wall profile of said device, on integrated protrusions which will serve to secure the handle with a through bolt, or alternatively, said handle may be mounted flush with the profile or perimeter of the stub wall of the wagon or cart device, or in another alternative embodiment, may be secured and mounted just inside the handle side end wall of said device.

Another object of the invention provides for a wheeled cart or wheelbarrow, with fixed, or one or more pivoting or stowable wheel axles, as well as a U-shaped handle which is slidably disposed within a cavity formed along the cart stub wall, and the user may slide the handle out to an operative, latched position, and said cart may include underside movable or pivoting, stowable supports. Unique handle latching methods are disclosed.

Another object of the invention provides for a unique, but simple nut or end cap washer or fastener which rotates in a cavity, or depending on both the cavity shape and the nut or cap shape, combine to stop or limit axial rotation of the stowable wheel's axle rod.

Another object of the invention provides for a "sleeve" accessory which may be resiliently and selectively attached to recesses or protrusions formed on the face of the device stub wall, which sleeve may hold beverage containers, umbrellas, fishing rods, or various implements.

These and other improvements may become apparent by virtue of descriptions contained herein.

BRIEF DESCRIPTION OF THE DRAWINGS

FIG. 3-A is a end elevational view, broken away, showing the wagon side wall and base;

FIG. 4 is a top plan perspective of the device 1-A, with components in the stowed position;

FIG. 4-A is a side elevational view, partly with a longitudinal cross-section perspective, isolating certain components;

FIG. 5 is a top plan view of a part of two wheeled devices, 1-A, showing such devices coupled;

FIG. 5-A is an end elevational perspective, in cross section, isolating the wheel axle assembly components and handle;

FIG. 6-A is an exploded view of handle retention components;

FIG. 6-B is a broken away perspective of the handle;

FIG. 6-C is a partly broken away view of selected handle components;

FIG. 6-D is an end elevational view, partially in cross section, isolating certain handle retention components;

FIG. 8-A is an end elevational perspective of the wheeled device 1-A isolating two alternative sliding access panel features;

FIG. 10 is a detached perspective of the access panel component of wheeled device 1-A;

FIG. 11 is a top plan perspective of certain handle and access panel components of wheeled device 1-A;

FIG. 12 is a top plan view, partially broken away, further focusing on the handle and access panel components of wheeled device 1-A;

FIG. 15-B is a side elevational perspective, partly in section, of a portion of the wheel assembly;

FIG. 16-B is a top plan perspective of an inside threaded washer embodiment;

FIG. 16-C is a top plan perspective of a specially shaped inside threaded washer embodiment;

FIG. 16-D is a top plan perspective focusing on the wheel assembly cavity details;

FIG. 17-B is a side elevational perspective, in section, showing details of the sleeve and device stub wall;

FIG. 17-C is a side elevational perspective, broken away, of the sleeve accessory holding an implement;

FIG. 18-A is a broken away view of the end cap details of the U-Shaped handle of the carrier device 51;

FIG. 18-B is a broken away perspective providing details of the underside support;

FIG. 18-C is a bottom plan view of the carrier device 51;

FIG. 18-D is an end elevational cross sectional perspective of carrier device 51, the stub wall and lip;

DESCRIPTION OF THE PREFERRED EMBODIMENTS

Figure 1:
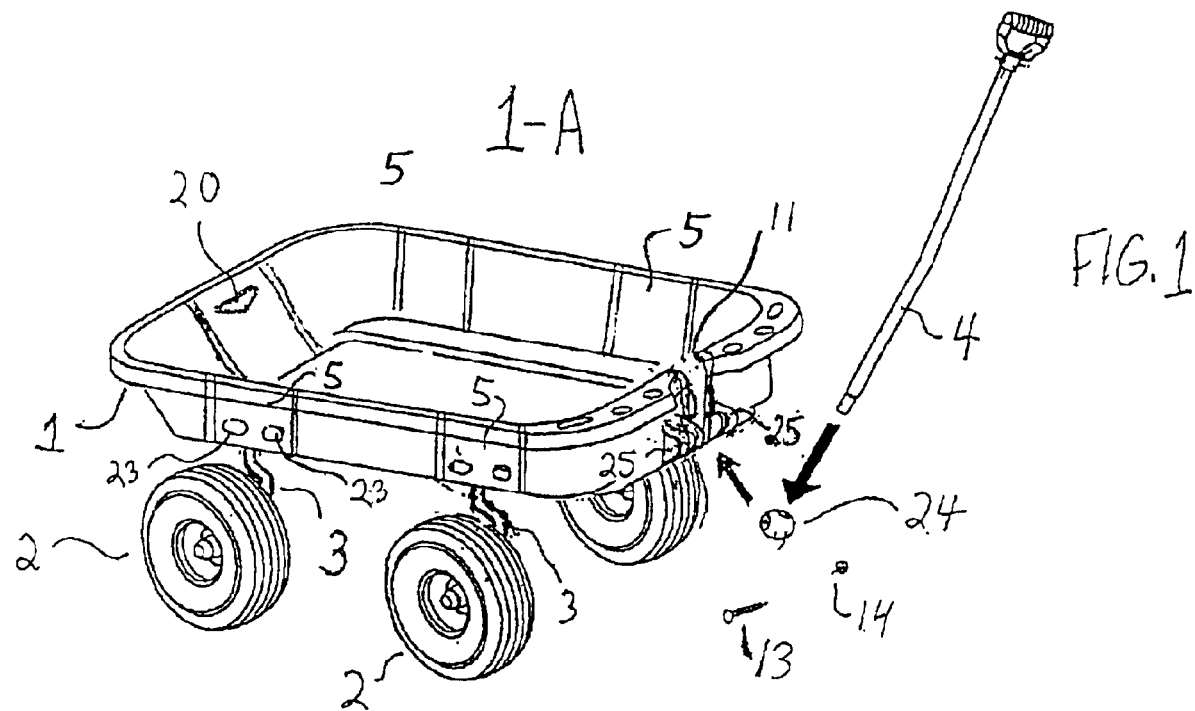
FIG. 1 is a side, slightly elevated perspective view of the wagon or cart device 1-A.
Figure 2:
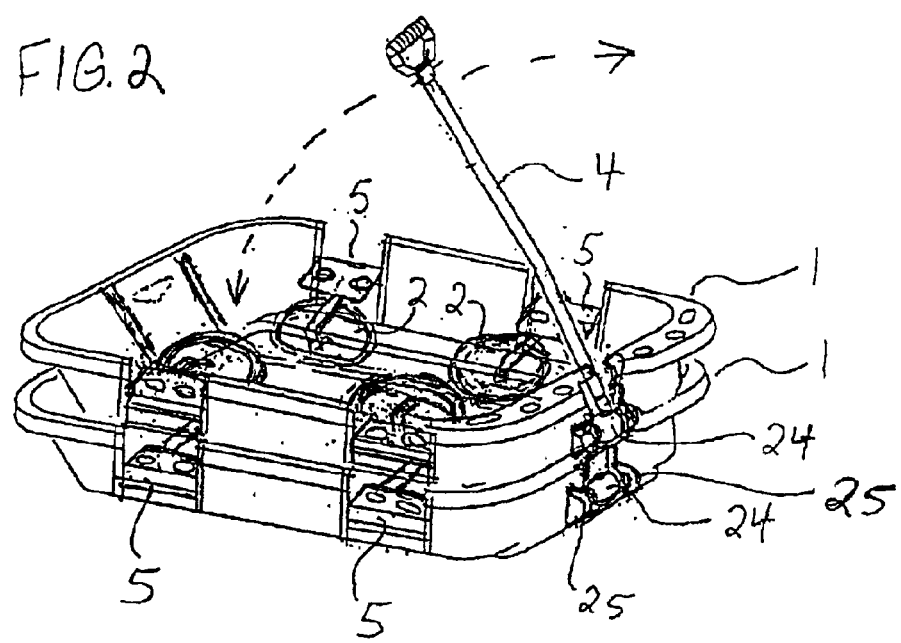
FIG. 2 is a side, slightly elevated perspective of two wagon devices in a stowed and nested perspective and is the preferred cover page figure.
Figure 3:
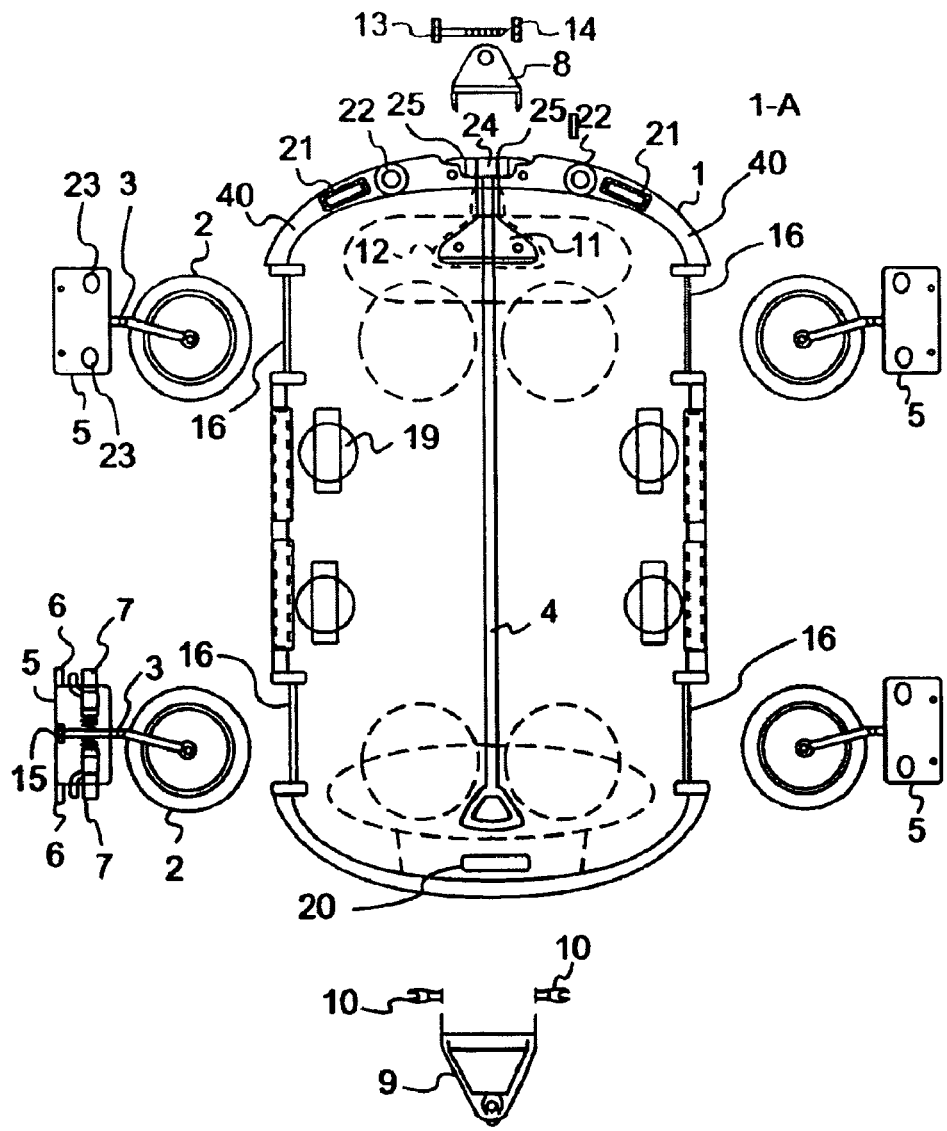
FIG. 3 is a top plan view, partially exploded, showing the major components of the device 1-A.
Figure 3A:
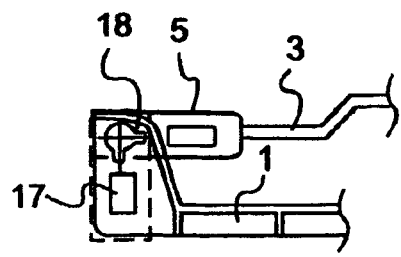

FIGS. 1 through 3-A show the essential components of a compact wagon with folding wheels and handle, denoted 1-A, which in this particular embodiment includes four wheels (although it is assumed that variations may include 2 or 3 wheels, and may include "carts" with non rotating wheels and a fixed handle). The embodiment in FIGS. 1 through 3-A includes a base or chassis including formed stub walls made of any suitable material, including any type of plastic. The wagon itself is indicated as 1, which includes four tires, 2, suitable axles, 3, a handle, 4, and the innovative pivoting wheel assemblies 5, which each may include two finger/access holes, 23, which the user uses to latch and release each pivoting wheel assembly, 5, between an operative and a stowed position which is further seen in FIG. 2 (stowed). In this embodiment, the handle, 4, is received within a recess or cavity inside a handle retention pivot, 24, which pivot is then mounted between handle bolt retaining protrusions, 25, which protrusions are molded or shaped to the exterior of the handle-side exterior end wall profile. Accordingly, the handle, 4, in an operative position, may be utilized by a user to pull or push the wagon device, but the innovations include provisions for pivoting and stowing the handle. First, an access panel for the pivoting handle may optionally be included as shown at 11 in FIG. 3 only. Such an access panel may pivot along a portion of the base, closest to the handle end, and pivot and stow flush along suitable recesses or a cavity in the upper edge of the base of the wagon device, 1. Alternatively, the access panel, 11, may be omitted entirely and the handle, 4, may simply pivot freely back and into the base to be stowed along the parallel profile just above the base of the wagon device as indicated in FIG. 2. A handle coupler bolt, 13, travels through the handle bolt retaining protrusions, 25, through a suitable opening in the handle retention pivot, 24, through another suitable protrusion, 25, and then a nut captures the bolt, thus holding the handle along the exterior forward base wall, as shown in FIG. 1. FIG. 1 also includes a recess in the end wall opposite the handle end, which may be used to grasp the wagon but, more importantly, may be used to support the device on a wall hanging hook. Referring to FIG. 2, two of the compact wagons are shown in the nested position with all of the wheels, 2, pivoted 270° and stowed wholly within the wagon base. Also, each of the compact wagon's handles are pivoted and stowed generally parallel and just adjacent to the uppermost edge of the middle of the wagon base. It is understood that various handle configurations may be adapted to this compact wagon, and this embodiment shows a central pull handle. Instead a u-shaped handle may be instead adapted to pivot out from a securement point in any suitable part of the side walls, where it may be stowed adjacent to or following the perimeter of the wagon device either inside or just above the stub walls, and it may be pivoted out to allow it to be used as a pull handle. In operation, the set of wheels nearest the handle, are 360° rotatable, and the rear set of wheels are normally fixed against rotation.

FIG. 3 shows an exploded view of several of the parts already described in FIGS. 1 and 2, and also adds several others. Each of the pivoting wheel assemblies, 5, are shown exploded from the wagon device, and one of the demonstrative wheel assemblies is shown to include bilateral pivoting wheel pivot cylinders, 6, which are found on each wheel assembly, 5, but only depicted on one wheel assembly in the illustrated figure. The bilateral pivoting wheel pivot cylinders, 6, mount within suitable openings in the pivoting wheel assembly cavities, 16, and each pivoting wheel assembly, 6, also includes bilateral pivoting wheel assembly latches, 7, which are spring-biased within the pivoting wheel assembly, 6, and as can be further seen in FIG. 3-A, the latches, 7, fit within the pivoting wheel assembly latch receiving cavities, 17, a pair of which are mounted within the aforesaid cavity, 16, although a simple latch may be employed. Referring further to FIG. 3-A, the pivoting wheel assembly, 5, and its axle, 3, are shown in a stowed position, and in a ghost view, the outline of the pivoting wheel assembly, 5, may be seen in the operative view. Importantly, FIG. 3-A also shows that when the pivoting wheel assembly, 5, is pivoted 270° to the stowed position shown, a portion of the pivoting wheel assembly latch, 7 (shown in FIG. 3), springs outward into a pivoting wheel assembly stowed position receiving cavity, 18 (seen in FIG. 3-A). In this manner, the pivoting wheel assembly latch, 7, not only serves to latch the pivoting wheel assembly in the operative position, but the fingerlike upper portion of latch, 7, also springs outward into the receiving cavity, 18, to lock and latch the same wheel assembly in the stowed position within the side elevational profile of the compact wagon device.

Referring back to FIG. 3, several other details are shown which include another view of the optional access panel, 11, for the pivoting handle, 4, and an access panel base retention cavity or recess, 12, which is formed from the base floor of the device as well. As discussed later in FIG. 5, the compact wagons may also be coupled in tandem or multiple units, and for this purpose, the device may include a pivoting handle end coupler, 8, and a non-handle end coupler, 9, which are pivotally mounted to the underside of the wagon at their respective ends. In FIG. 3 is shown that coupler, 8, actually pivots under the base floor when stowed, and pivots out approximately 180° into an operative position and is held in place by the same handle coupler bolt, 13, and its nut, 14, or may be held by separate pin, 10, such as would hold the non-handle end coupler, 9, as also shown. Suitable recesses may be placed in the base of the compact wagon as shown at 19, primarily for beverages. And the recesses shown at 21 and 22 may have the multiple purpose of having a shaped recess in a flattened portion of the compact wagon stub wall lip, 40. Shaped generally rectangular recesses, 21, may fit box-like beverage holders and further smaller pass-through openings within the same general recesses may allow small garden tools to pass through the complete openings. 22 are cylindrical recesses for round beverages, with another rounded smaller openings to hold small garden tools.

FIG. 4 is similar to FIG. 3, showing the top plan view of the wagon device, but in FIG. 4, the parts are not exploded but instead stowed within the confines of the compact wagon perimeter. Each of the parts shown have been previously described in FIG. 4; however, in this view, the handle retention pivot, 24, can be seen outside the handle side front or end wall, and is mounted by the bolt, 13, which travels within suitable shaped protrusions, 25, on either end of the pivot, 24. However, reference to FIG. 4-A shows that in this embodiment, the pivot, 24, is essentially mounted nearly within the profile of the handle side end wall, and the pivot point is essentially under the forward lip, 40. The handle is shown in the stowed position generally parallel and flush with the upper edge of the compact wagon base. Two different methods are shown for retaining the stowed handle, 4, in the position shown. First, a suitable protrusion may be molded in the inner aspect of the compact wagon, 1, end wall as shown at 35. This may resiliently retain the handle in the stowed position. Alternatively, detentes, 26, may be formed on opposite ends of the handle retention pivot, 24, which are captured in suitable recesses shaped within the wagon end wall immediately adjacent to either side of the handle retention pivot, 24 (no specific view is shown of the recesses which capture the detentes, 26). In this manner, the handle may be retained in an intermediate position generally pointing upward as shown in one of the ghost perspectives in FIG. 4-A or the user may overcome the pressure of the detentes and further stow the handle generally flush with the base floor. Of course, the handle may be fully pivoted out also to the operative position. Alternative methods of providing for the intermediate or stowed position of the handle are described in FIGS. 6-A through 6-D later in this application.

FIG. 5 shows a broken away view of two wagons coupled by suitable interconnection between couplers 8 and 9 which have been pivoted out from the underside storage position under each wagon. Any suitable method of protrusion and matching recess, or male and female connection may be employed to resiliently join the couplers. One of the couplers, when pivoted out, may double as a wall hook receiving member. The view also shows the optional handle access panel, 11, described earlier, in a stowed position.

FIG. 5-A shows the manner in which two pivoting wheel assemblies, 5, are stowed within the compact wagon and in this view from the end wall, cross-sectionally, the center pull handle, 4, is also seen. Depending upon the size of the tires, 2, and the height of the stub walls, each of the wheels may be latched or locked in the stowed position at any particular suitable angle to the stub wall. Alternatively, the wheels, 2, may partly or fully sandwich or overlay each other by being offset (not shown). Also, the handle, 4, may stow under or over the stowed wheels (not shown).

FIGS. 6-A through 6-D are directed at innovations which permit the pivoting handle to have a convenient intermediate position whereby the handle, 4, is conveniently maintained in an upright position, and a further stowed position where it is resiliently maintained generally parallel and closely adjacent to the upper face of the base of the wagon device. Referring first to 6-A, this figure shows an exploded view of the handle, 4, and handle retention pivot, 24, previously discussed, as well as the handle bolt, 13, and handle nut, 14. What is now shown is an additional handle detente/protrusion sleeve, 36, which is generally cylindrical and may be mounted around the exterior of the handle, 4, butt, or alternatively, mount inside the handle, 4. In either case, the handle detente/protrusion sleeve, 36, includes up to two handle sleeve protrusions, 37. When constructed, the handle protrusion sleeve, 36, is mounted inside or outside the butt end of the handle, 4, and each of the sleeve protrusions, 37, protrude outward from the preferably cylindrical handle which instead itself may be shaped, with integrated protrusions, or with a shape which resiliently holds on the facing stub walls in one axis, but when turned to another axis can pass through said walls to stow flush with the base. A pair of protrusion sleeve bolt receiving openings, 41, travel through said protrusion sleeve and once the sleeve is placed around or inside the butt end of the handle, 4, both units are then placed inside the handle retention pivot, 24, and then the entire unit is secured by the bolt, 13, which also travels through suitable protrusions or openings in the end wall of the wagon (not shown here in 6-A). As shown in FIG. 6-B, there is also an elongated handle bolt opening in the handle, 4, butt end, and for purposes of illustration, the handle bolt, 13, is shown which has permitted movement along the elongated hole, 38, and one such elongated hole is on either end of the handle butt end. FIG. 6-C simply shows the bolt, 13, passing through the elongated hole, 38. Last in this series, FIG. 6-D is intended to show all of the aforesaid parts mounted in the end wall of the compact wagon, 1. And particularly, when the user desires to pivot the handle into an out of the way, generally upright intermediate position, the handle detente/protrusions, 37, are retained within handle protrusion wagon wall receiving surfaces, 42, which serve to hold the handle in an upright position. To overcome this intermediate position, this embodiment allows the user to engage in one of two separate actions in order to then pivot the handle, 4, down into the fully stowed position along the base floor. First, the user could grasp the handle, pull it slightly away from the wagon wall in the direction outside the wagon base and then rotate the handle, 4, a quarter turn and then pivot the handle once again toward the wagon base so that the handle sleeve protrusions, 37, do not contact the handle protrusion wall receiving surfaces, 42, allowing the handle to clear the handle pivot wall opening, 43, effectively allowing the handle to pivot freely into the stowed position along the base floor. Alternatively, the same design described, which includes the handle detente/protrusion sleeve, 36 (shown in FIG. 6-A), may be constructed so as to allow "play" and resilient movement of the handle detente/sleeve protrusions, 37, and if this is the case, the user need not rotate the handle a quarter turn in order to overcome the resilient upright handle position and instead may simply push and force the handle through the opening, 43, shown in FIG. 6-D to fully stow the handle along the base floor. FIG. 6-D further shows the stowed position of the wagon coupler, 8, whereby it is mounted with suitable pins, 10. When the user desires to use the coupler, it would be pivoted about 180° out from the underside of the wagon.

Figure 7:
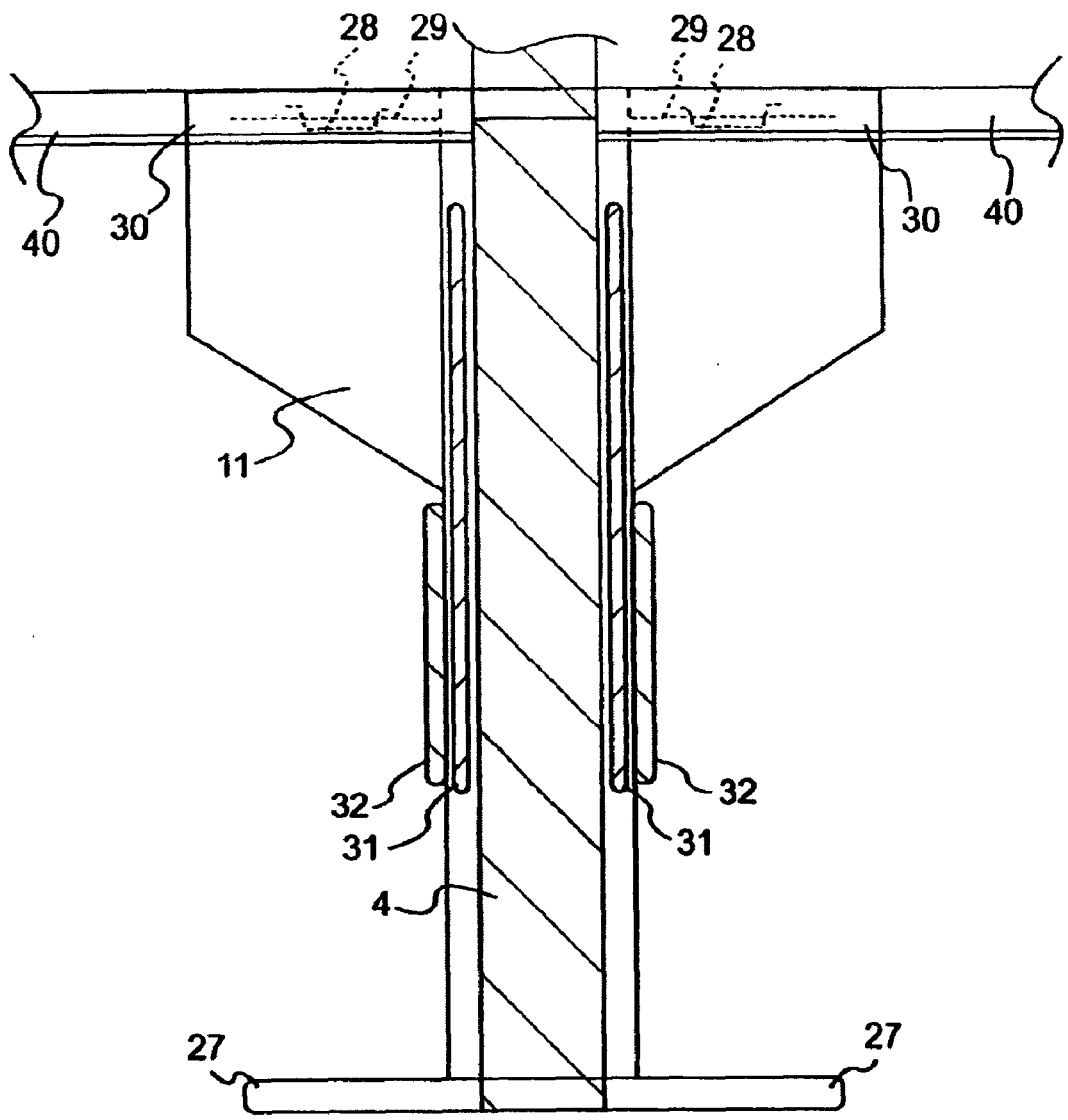
FIG. 7 is an end elevational view of the access panel components of wheeled devices 1-A, isolating certain components.
Figure 8:
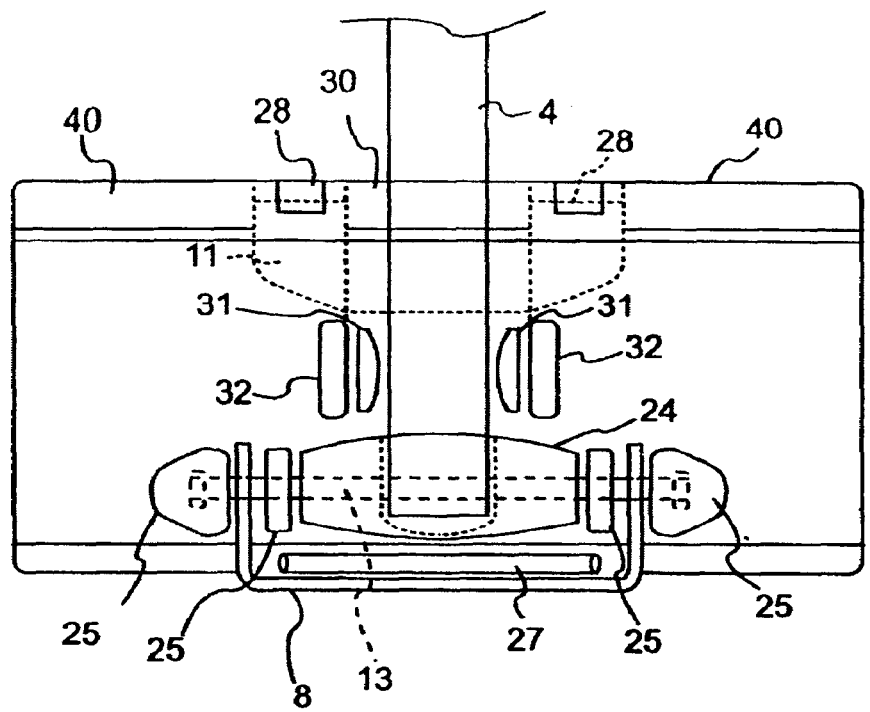
FIG. 8 is an end elevational perspective of the wheeled device 1-A isolating certain handle and coupler components.
Figure 8A:
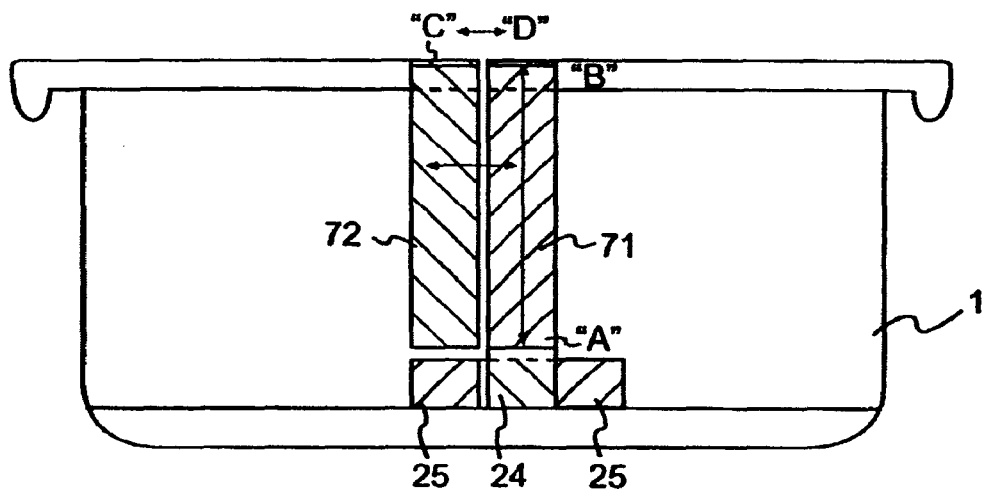

FIGS. 7 through 12 all address an alternative embodiment of the compact wagon, 1-A, which also includes an access panel, 11, as shown in FIG. 7. The purpose of the access panel is to have the continuity of a complete interior wagon stub wall in the area adjacent to the pivoting handle, rather than an opening or gap to allow for the pivoting of the handle (which opening, 43, was described earlier and is particularly shown in FIG. 6-D). The preferred embodiment of the access panel provides that it is mounted with an access panel pivot/retainer, 27, which are ears or extremities at the foot of the panel, 11. Not shown in FIG. 7 is that the extremities, 27, would interfit resiliently in a suitable cavity in the wagon wall base, allowing it to be resiliently snapped into placement from inside the base. FIG. 8 places the access panel in perspective in the views from outside the wagon wall looking in the direction toward the interior of the wagon from the exterior. In FIG. 8, the access panel is in its operative position where it simulates a continuing wagon wall and is pivotally held in position at its uppermost portion by an access panel lip, 30, which is of a similar dimension and profile as the adjacent or contiguous wagon wall lip wall, 40, as shown in FIGS. 7 and 8. Suitable portions of the access panel, 11, lip protrusion, 28, travel over and resiliently retain on top of the wagon wall lip, 40. As can be seen more clearly in FIG. 11 when the access panel is snapped into placement, it interfits over wagon wall lip, 40, and two or a other suitable number of access panel lip protrusions, 28, resiliently snap into wagon wall lip openings, 29, as seen in FIG. 11 and in FIG. 7. Further, the access panel, 11, includes a pair of access panel handle retainers, 31, which are shown more clearly in FIG. 10 and FIG. 12. As shown in FIG. 12, the access panel handle retainer members, 31, also are held in place by matched wagon wall access panel retainers, 32, formed from a portion of the exterior of the wagon end wall. FIG. 12 further shows that when the access panel, 11, is in the operative and upright position, where it simulates the wagon end wall, when the handle is pivoted into an upright position, the handle, 4, is maintained in position by the access panel handle retainer, 31.

FIG. 8 shows a complete view of all of the handle retention components as well as the access panel components maintained in a position where the handle is in an upright position retained by the access panel handle retainers, 31, which themselves also resiliently interfit with the access panel retainers, 32. FIG. 8 also shows that the handle end coupler, 8, may be mounted along a portion of the same handle bolt, 13, instead of with separate pins.

FIG. 8-A is an end view showing two alternative access panel embodiments for the handle end wall of the wagon device 1. The handle pivot 24, and the handle retaining protrusions 25, are shown for perspective, though the handle is omitted. A upward sliding handle access panel 71 also entirely slides and retracts downward into the device base, as indicated by the letter "A". When this panel is operative, it is slid upward as indicated by "B" where it provides a simulated flush wall appearance. In another sliding access panel variant, shown at 72, the same type access panel instead slides laterally, such that the letter "C" indicates the retracted, hidden position, and the letter "D" indicates the operative, laterally slid position. In either sliding embodiment, the panel may be recessed in whole or part within the cart base profile. When the panel is in its operative or even in a stowed position, it may include protrusions or recesses which cause resilient contact with the handle to retain it in either an intermediate, upright position, or in a stowed position (not shown).

Figure 9:
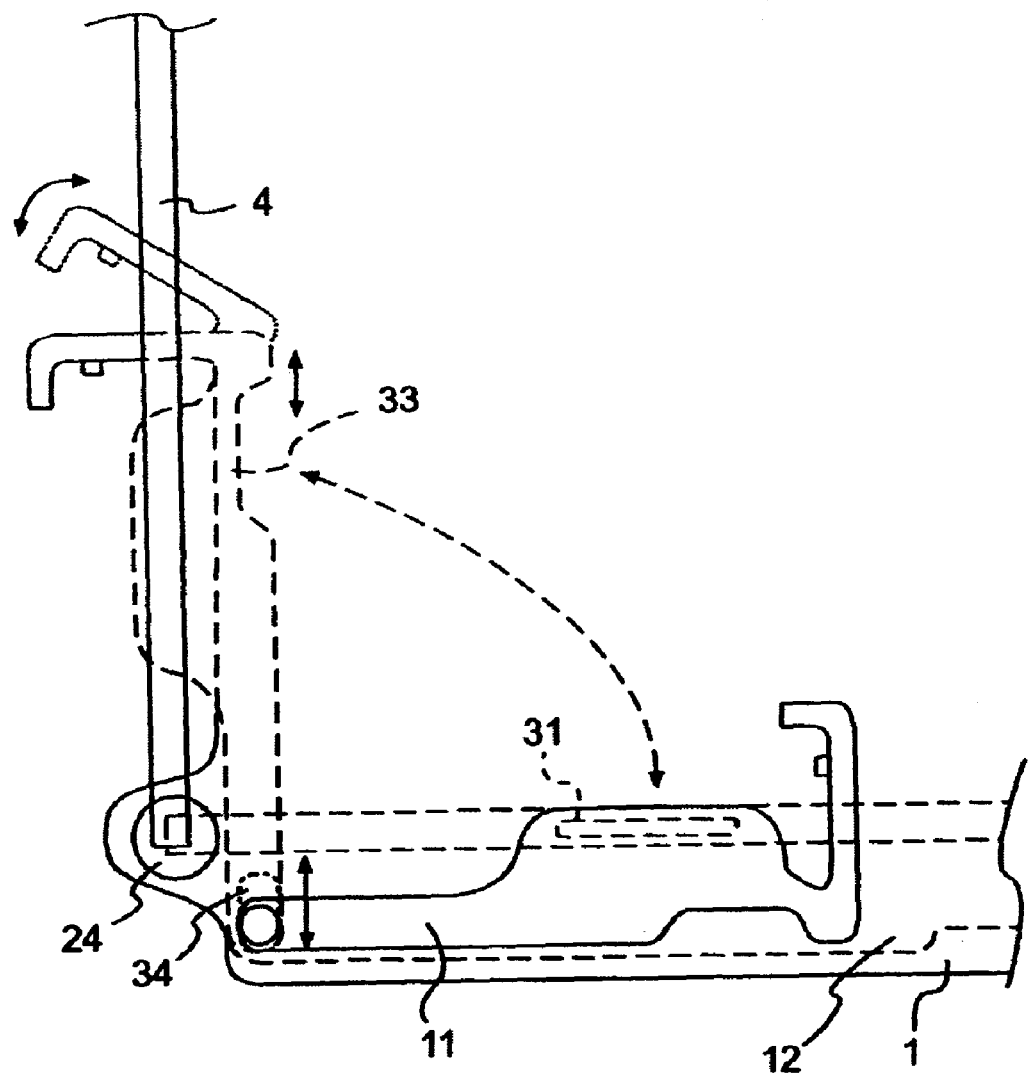
FIG. 9 is a side elevational perspective, partly in cross-section, of wheeled device 1-A focusing on the handle and access panel components.
Figure 13:
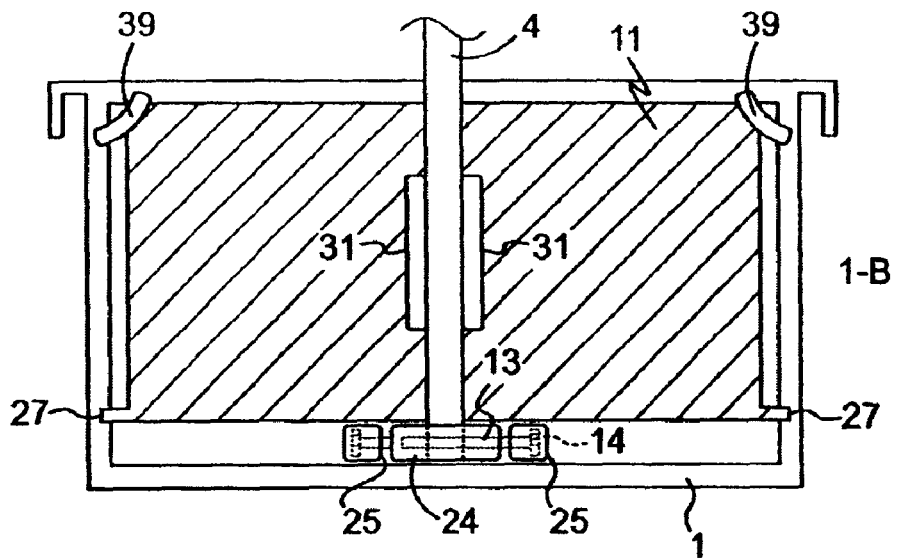
Figure 14:
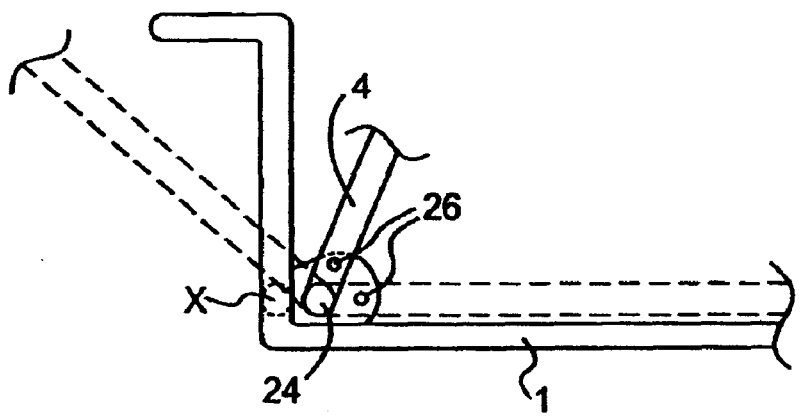

FIG. 9, also in this series, demonstrates a profile showing the access panel, 11, in a stowed position along the compact wagon base and particularly in a matching cavity or recess, 12. The handle, 4, shown in FIG. 9 in an upright position, but also in a ghost view, the handle is pivoted and shown parallel to the wagon base, where it is again maintained within the bilateral access panel handle retainers, 31. FIG. 9 indicates in ghost view how the access panel, 11, may be then pivoted and raised 90° by the user because it is mounted in a slightly elongated access panel pivot cavity, 34. The elongated cavity, 34, allows the user to slightly raise the access panel when it is lifted into its operative position where it can resiliently snap over a matching portion of the wagon wall lip, 40 (as shown in other figures). As is shown in FIG. 9, there is also included a finger grip or cavity, 33, which provides for the user to have a gripping portion of the access panel when manipulating it. Also FIG. 9 shows the handle retention pivot, 24.

Figure 13:
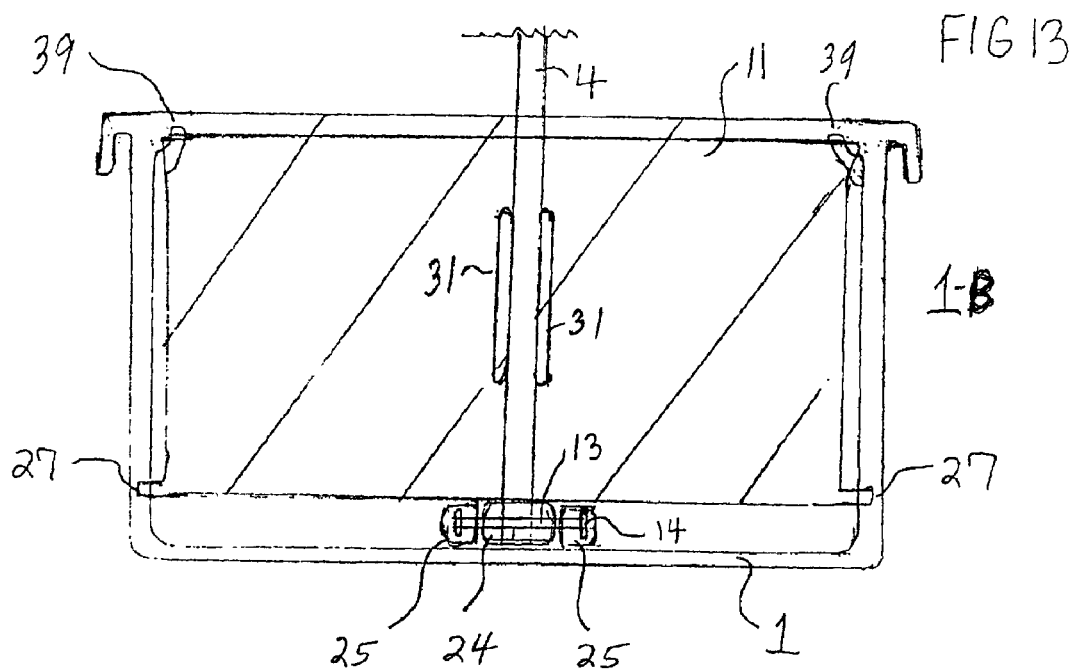
FIG. 13 is an end elevational view, a variation of the wheeled device denoted 1-B, focusing on the handle and access panel components, including a different embodiment of the access panel.
Figure 1:
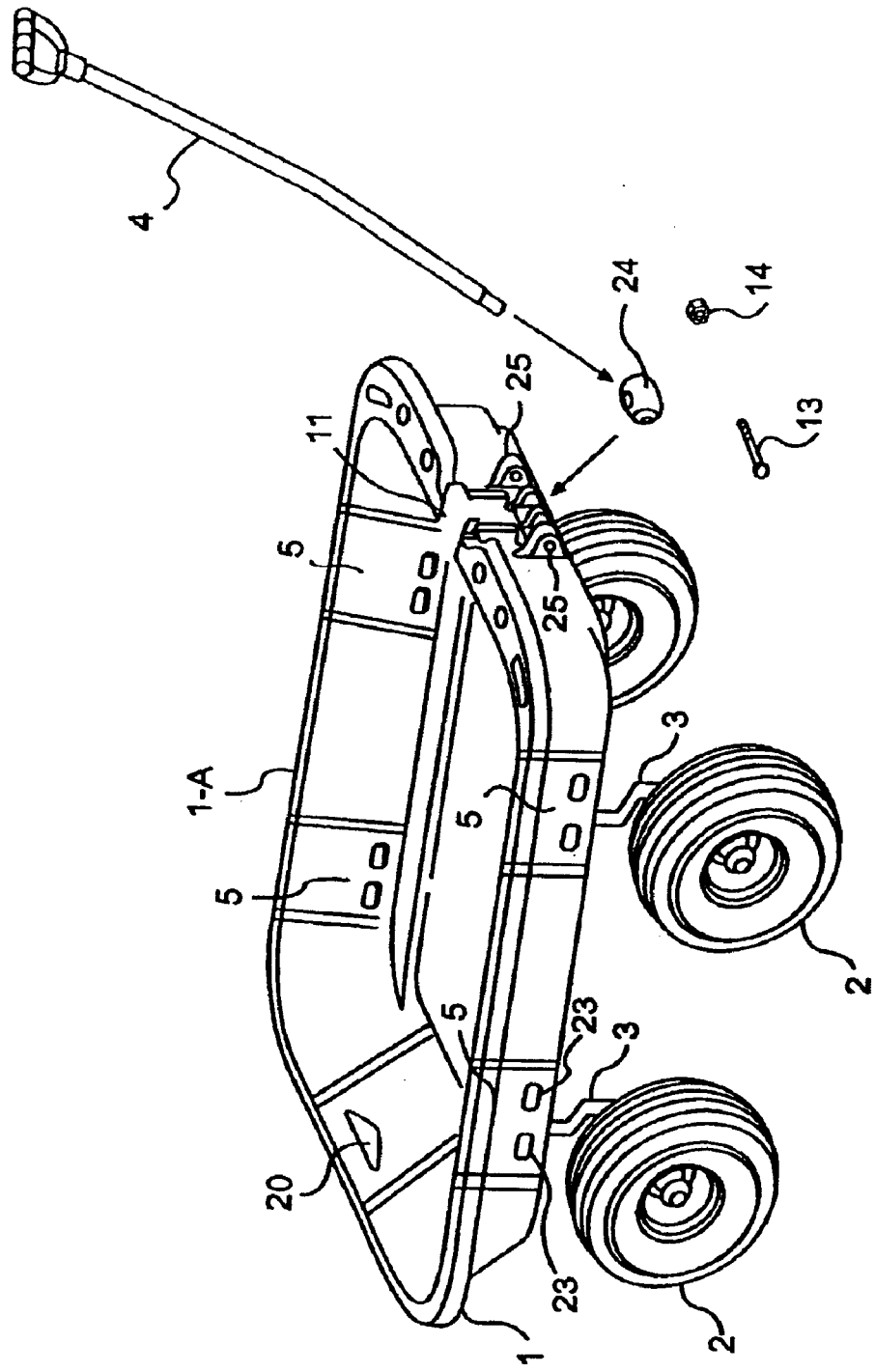
Figure 2:
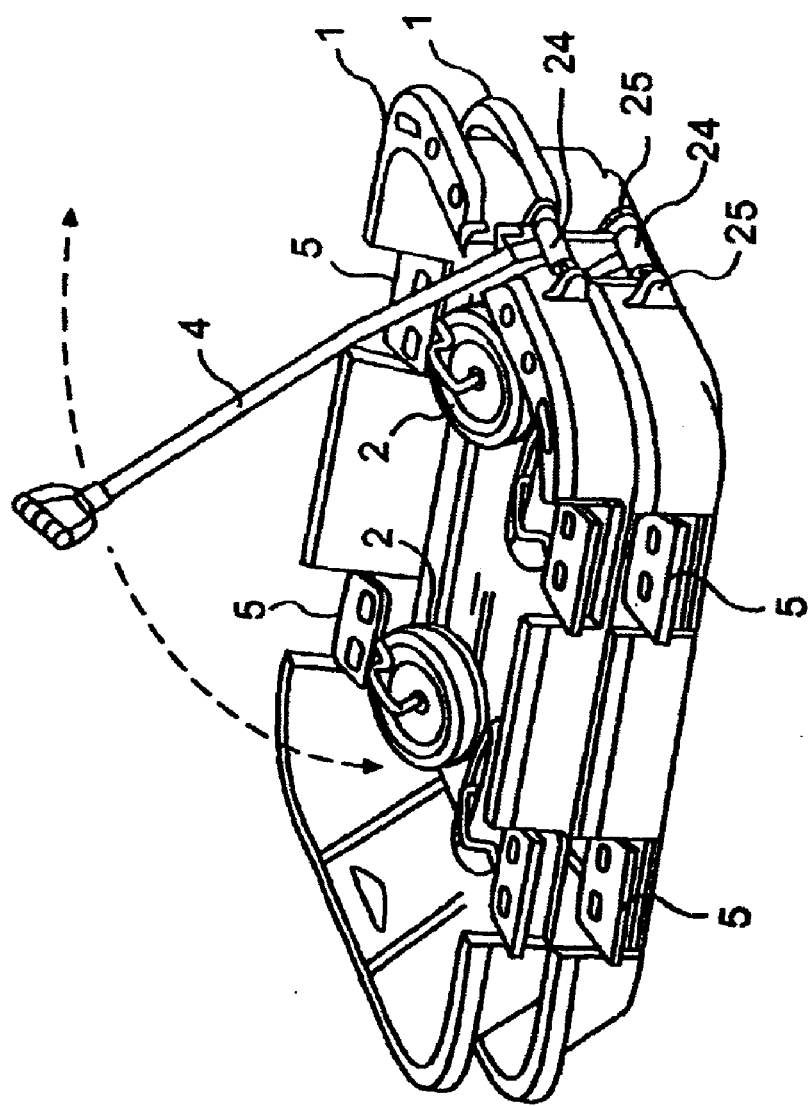

FIG. 13 shows an alternative embodiment of the access panel, 11, which essentially comprises the entire end wall closest to the handle retention location. All of the other components indicated in FIGS. 7 through 12 are the same as shown in FIG. 13 with the exception of the access panel comprising essentially the entire end wall nearest to the handle. The other additional element is that suitable portions of the access panel alternative embodiment shown here may include projection openings or cavities to receive any suitable protrusion, 39, molded in a portion of the inner aspect of the side walls so that when the access panel is in upright operative position, it is resiliently maintained.

Figure 14:
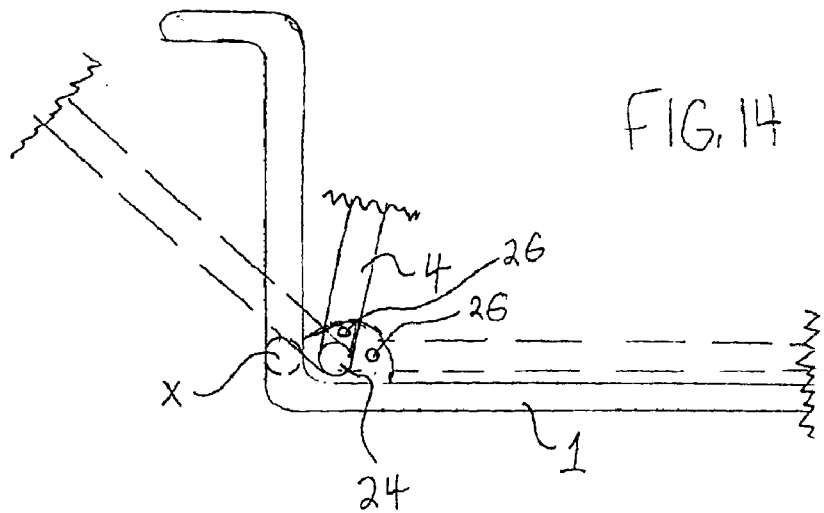
FIG. 14 is an alternative embodiment of the wheeled device, indicating alternative locations for the handle retention position, and is a side elevational profile, partly in cross section.

FIG. 14 shows alternative handle retention locations on the compact wagon, 1. Here in FIG. 14, in this alternative embodiment, the handle retention pivot, 24, is maintained in the inner aspect of the compact wagon base very close to the end wall, and the handle is pivotally mounted so that it stows flush or parallel with the wagon base, and again may be pivoted out through an opening in the end wall (not shown here) so that the user may pull the wagon by the handle, 4. The "x" in FIG. 14 indicates an alternative handle retention location essentially flush within the profile of the end wall.

Figure 15A:
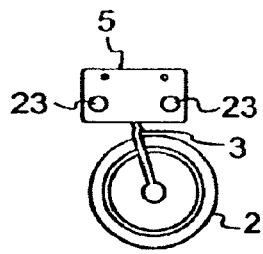
FIG. 15-A is a side elevational profile of the wheel assembly and wheel, with a detached perspective.
Figure 15B:
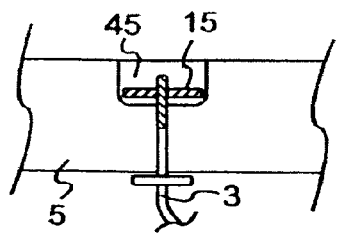
Figure 16A:
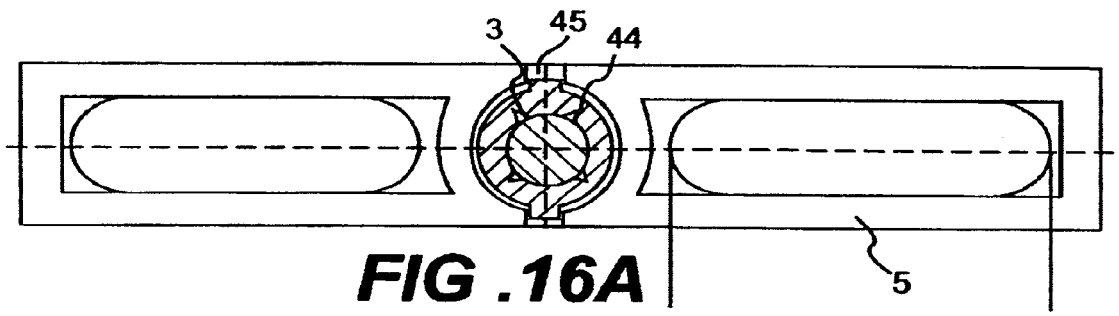
FIG. 16-A is a top plan perspective of the wheel assembly.
Figure 16B:
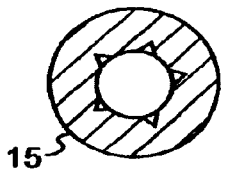
Figure 16C:
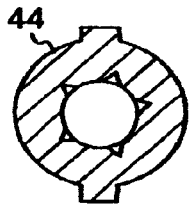
Figure 16D:
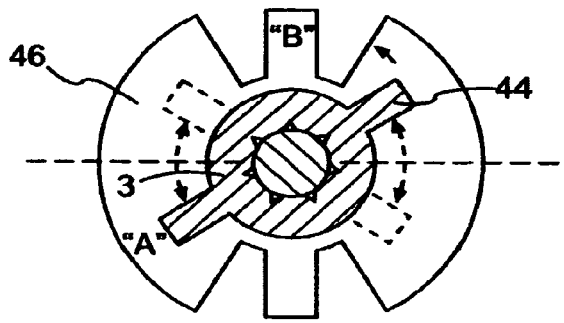

FIGS. 15-A through 16-D address details of the unique fixation, rotation, and limited axial rotation methods for the wheel axle of the inventions. The methods are achieved by interplay between the axle end caps/nuts and a shaped cavity of the wheel assembly cavity surrounding the end cap/nuts. FIG. 15-A shows a wheel assembly embodiment 5, tire 2, wheel axle 3, and the finger access holes 23. FIG. 15-B indicates the upper portion of the axle 3, traveling through the wheel assembly 5, the wheel assembly cavity 45, and a washer or end nut 15 forced onto said axle 3. FIG. 16-A is a top plan view of the same wheel assembly 5 depicting a wheel assembly axle cavity 45, through with the upper portion of the wheel axle 3 extends, and in the cavity 45 is forced, preferably, a specially shaped inside threaded nut or cap 44. In this embodiment, the washer 44 (also shown in FIG. 16-C) is shaped with two protrusions, which extend into matching cavities as indicated in FIG. 16-A. FIG. 16-B shows round inside threaded washer 15, and if this washer is placed in the same cavity shown in FIG. 16-A, then the axle 3 (and associated wheel) is allowed 360 degree rotation, such as may be preferred on the forward pair of wheels on a wagon, though the rear pair of wheels may be fixated with the specially shaped washer, though the same wheel assembly cavity may be employed. FIG. 16-D isolates a wheel assembly axle receiving cavity 46 of yet another shape, designed to allow less than 360 degree rotation, which may be preferred in some applications. The end cap/nut 44 is rounded, with two elongated protrusions. When the end cap 44 is in the larger cavity indicated a "A" it may rotate axially with limited movement, but if the end cap protrusions of end nut 44 is instead forced into the cavity indicated at "B" the axial rotation of the axle 3 is eliminated.

Figure 17A:
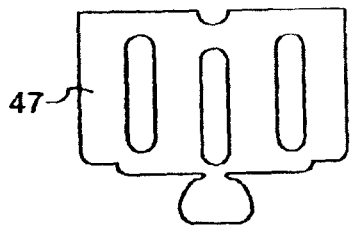
FIG. 17-A is a side elevational perspective of the sleeve accessory.
Figure 17B:
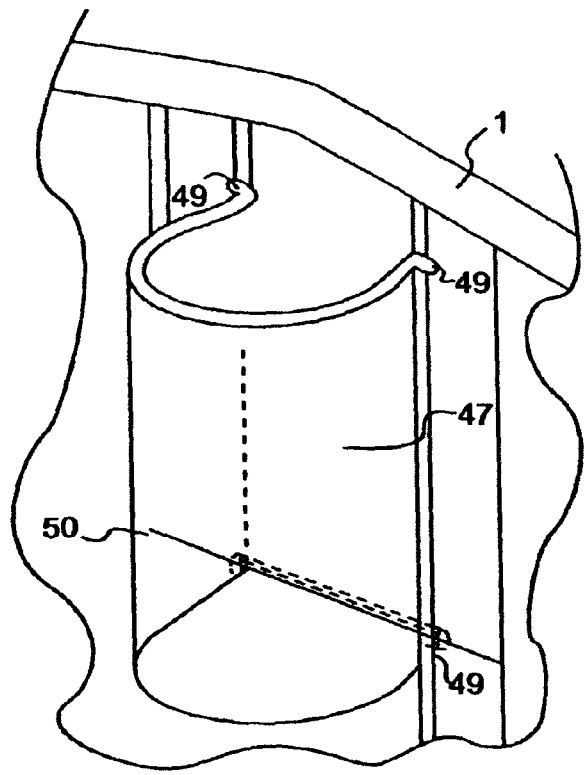
Figure 17C:
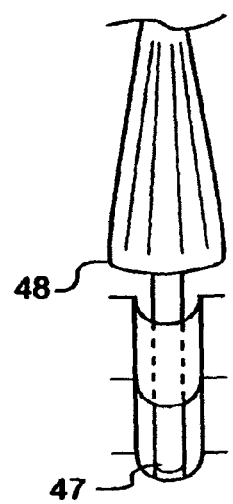

FIGS. 17-A to 17-C depict the sleeve accessory 47, which is first shown at FIG. 17-A, and is resiliently pressed into a half moon shape as seen in FIG. 17-B and is pressed through suitable stub wall recesses 49 (or alternatively, protrusions) and the bottom may be formed by folding same where it also may also be retained against the stub wall of the wagon 1, abutting lateral ribs and being secured with either cavities or protrusions 50. Last, in FIG. 17-C an implement (here, an umbrella 48) may be held in the sleeve 47, as well as any tool, fishing rod, beverage, etc. The bottom "floor" portion of the sleeve accessory may be broken away or omitted should a very elongated handle or rod accessory be placed in the product.

Figure 18:
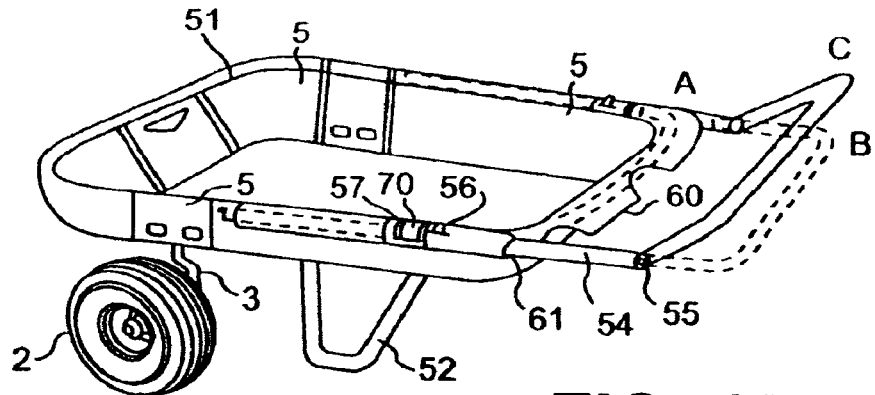
FIG. 18 is a side elevational perspective, elevated, of a carrier device embodiment 51.
Figure 18A:
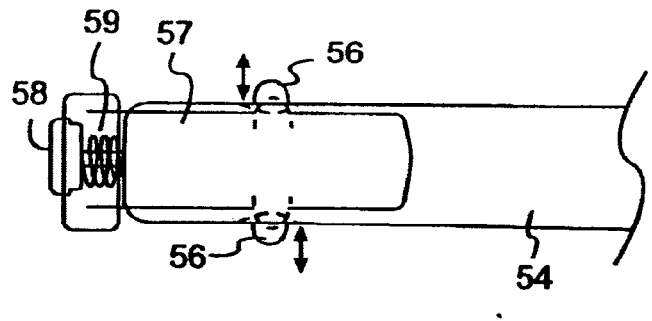
Figure 18B:
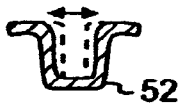
Figure 18C:
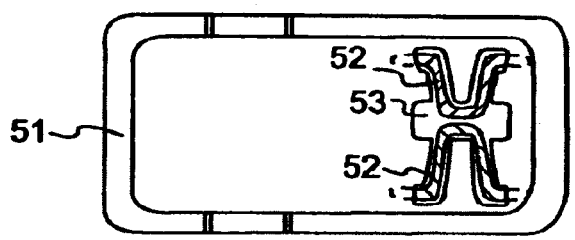
Figure 18D:
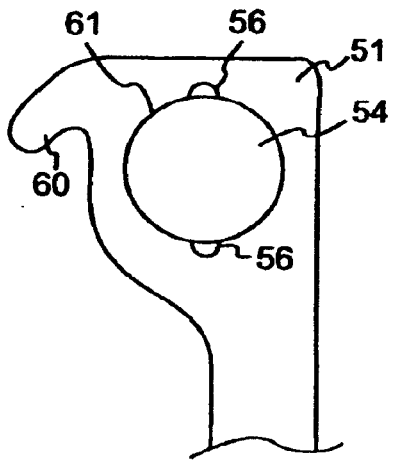

FIGS. 18 to 18-D address an alternative carrier device, denoted 51, which as shown is a two wheel cart (but which may instead be a single wheel wheelbarrow with central forward wheel, using a pivoting or movable wheel axle assembly as disclosed here and in the inventor's original or continuation application). Referring to FIG. 18 this cart may include a pair of opposing stowable wheels 2, connected by an axle 3, to pivoting wheel assemblies 5, which form an integral part of the cart's formed stub walls. Not shown, is that the wheels pivot in to the device base, in a stowed, latched position wholly within the cart stub wall's periphery. The rear, handle end of the cart is supported on a pair of underside supports, one shown at 52. A U shaped handle 54 is slidably disposed within a cavity 61 on either side of the cart device. When the handle 54 is fully stowed, it occupies the position shown at "A" in FIG. 18, where it is resiliently retained by a suitable shape in the stub wall lip 60. Said handle may be either a one stage unit, or may be a two or more stage telescoping unit.

In operation, the user pulls the handle, 54, from its stowed position partly or wholly under the lip, 60, within a cavity area, 61, until it is extended to the position shown in ghost outline at "B". The handle may be of two stages, and telescope (not shown) and the handle grasping end may pivot and latch in various positions, such as that shown at "C", by virtue of an adjustable dial or latch and release 55. Referring to FIGS. 18-A and 18, one or more detentes, 56, are mounted through a handle end cap unit, 57, mounted in the handle, 54. At the terminus of the end cap there is a push button, 58, which is spring biased against spring, 59. When the handle is slid out to the operative position one or more detentes, 56, spring out of the cavity, 61, as shown in FIG. 18, although the cavity or opening which permits the detent to engage may be instead hidden within the cavity, 61. Also, a second cavity or opening, 70, is shown. When the handle is fully extended, the detente, 56, engages outward and limits the travel in either direction, and also the end cap, 57, may be of an enlarged circumference and size, which may reach the cavity opening, 70, to limit travel and handle extension. To retract the handle, 54, the user presses the handle end cap, 58, which is accessible through the handle cavity opening, 70. FIG. 18-D shows one embodiment shape for the cavity, 61, handle, 54, and detentes, 56, in the carrier device, 51, wall, which includes a shaped lip, 60.

FIGS. 18-B and 18-C show the underside support 52, two of which preferably are mounted within shaped cavities 53 molded or shaped in the wagon, 51, underside (instead a single support may be mounted transversely, but is not shown). Each support is forced into its cavity, and when each support 52 is erected, any suitable shape in the cavity or the support serve to retain the perpendicular erected position, not shown here but partly shown in FIG. 18.

Figure 20:
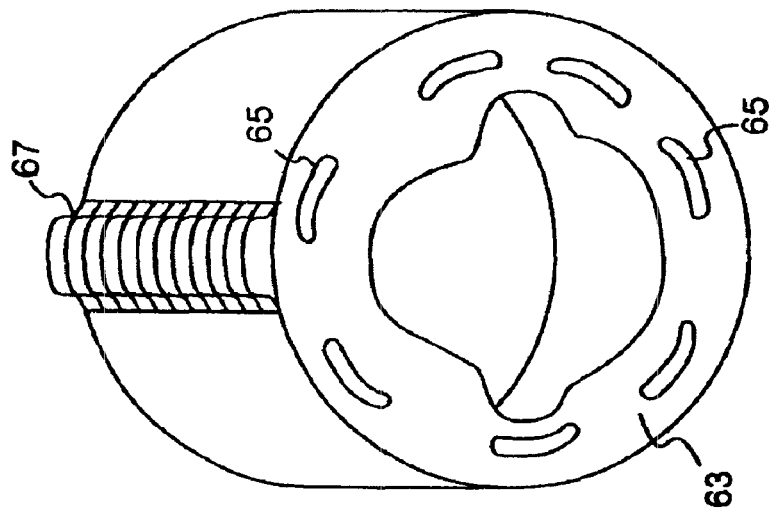
FIG. 20 is a detached perspective showing details of the handle latching ring.
Figure 19:
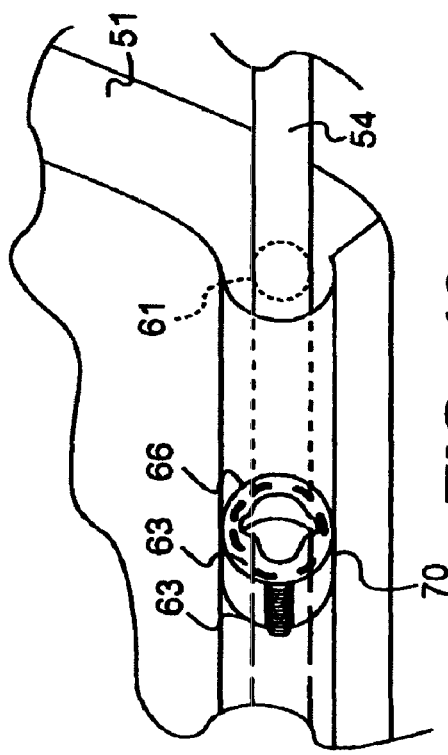
FIG. 19 is a side elevational perspective, elevated, of the carrier device embodiment.
Figure 21:
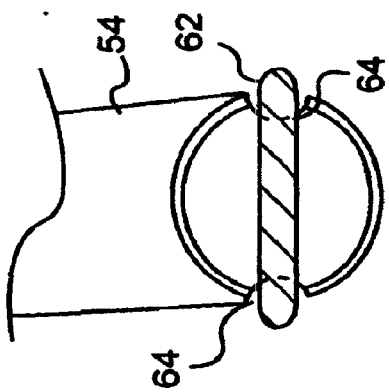
FIG. 21 is a partly broken away cross sectional view of the handle of device 51.
Figure 22:
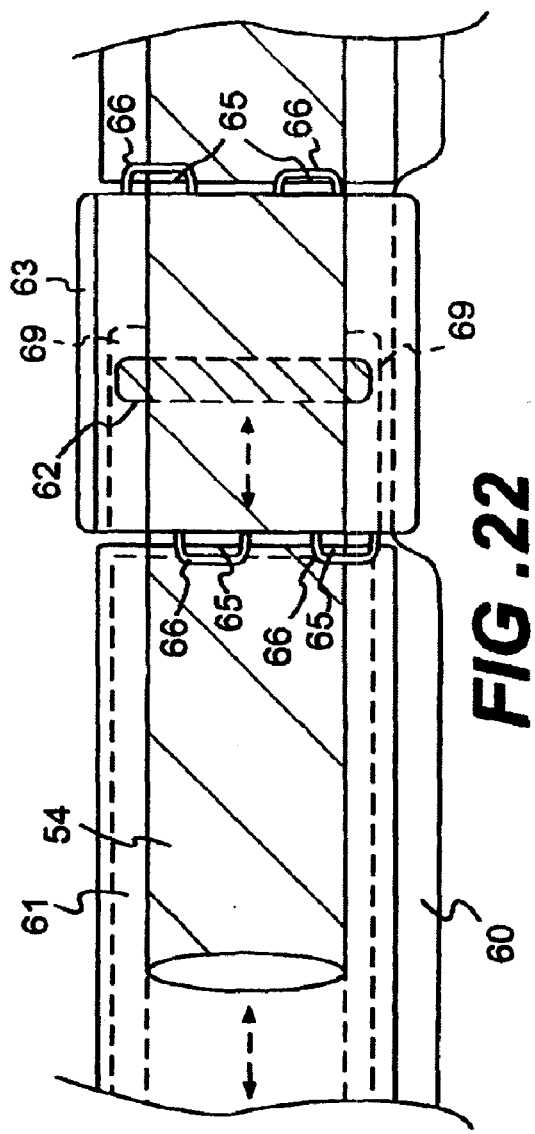
FIG. 22 is a top plan perspective, partly in section, of device 51 handle and an embodiment of a latching structure.

FIGS. 19 to 23 detail an alternative embodiment for the handle latching mechanism of the carrier device 51, which latching mechanism is utilized when the handle is slid to its operative position. The same carrier device 51 as shown in FIG. 18 is altered as shown in FIG. 19 where the handle cavity, 61, has an opening, at 70. A handle latching ring 63, shown in FIG. 20, is forced into the handle cavity opening at 70 and resiliently maintained. The handle is placed into the cavity, 61, and through the ring, which ring may rotate about a ¼ turn. Subsequent to placement of said handle, 54, into the cavity, 61, a suitable pin, 62, with suitable protrusions is affixed to said handle in near proximity to its terminal end through any suitable access opening through the cavity, 61. This figure also shows the ring grasping protrusions, 67. Referring to FIGS. 21 and also 19 and 20, the ring 63 is held into place in the stub wall facing wall recesses (discussed below) by protrusions 65 on either side, and the inner aspect of the ring includes shaped recesses to allow a pin, 62, which threads through handle pin through holes 64 in the handle 54. In operation, ¼ turn of the latching ring secures the handle pins within the inner cavity of the latching ring, effectively securing the handle against movement while in use. The user turns the rings a reverse ¼ turn to release and retract the handle. Suitable protrusions in the latching ring 63, when in conjunction with corresponding recesses in the facing walls 66, hold the latching ring in either the "latched" or "unlatched" positions (the protrusion and recess arrangement may also be reversed). Also, FIG. 22 shows that the pin or protrusions, 62, also serve as "guides" in the handle cavity, 61, during its travel through the cavity, 61.

Figure 23:
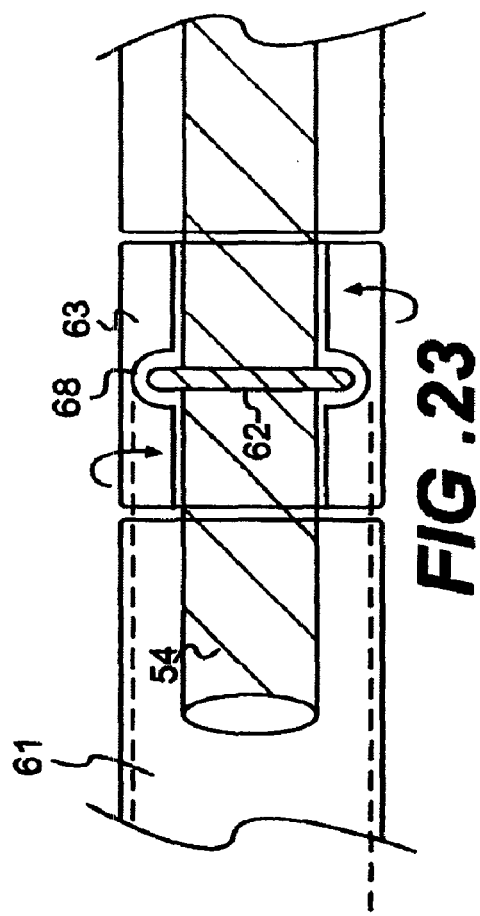
FIG. 23 is a top plan perspective, partly in section, of the handle latching structure and pin.

FIG. 22 shows the handle 54, within the cavity 61, and indicates that when the handle is fully operative and extended, the threaded pin 62 reaches a terminus 69 within the confines of the latching ring 63. The same figure shows that the ring 63 is held in place around the handle 54, as well as by the ring's protrusions 65 which are shaped in an intermittent circular shape around the outer facing walls of the ring, and which then match with corresponding recesses, 66, in the inward facing portions of the stub walls (not shown). FIG. 23 then further shows that once the handle pin, 62, reaches its travel terminus, the ring, 63, may be partly rotated and that this rotation entraps the pin (latching the handle in place in relation to the carrier device) within the ring 63 inner cavity 68, and the ring is reverse rotated about ¼ turn to release the handle pin (whereby the user may retract the handle to a fully stowed position substantially within the perimeter of the carrier device).

Although the invention has been described above in relation to preferred embodiments thereof, it will be understood by those skilled in the art that variations and modifications can be effected in these preferred embodiments without departing from the scope and spirit of the invention.

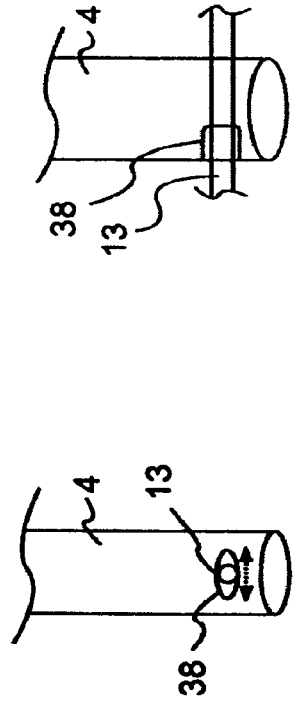
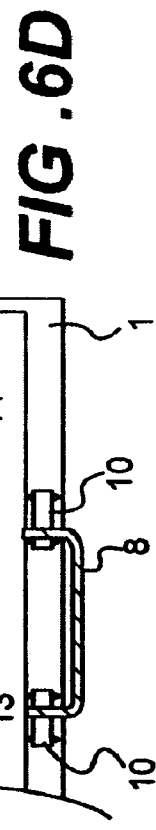
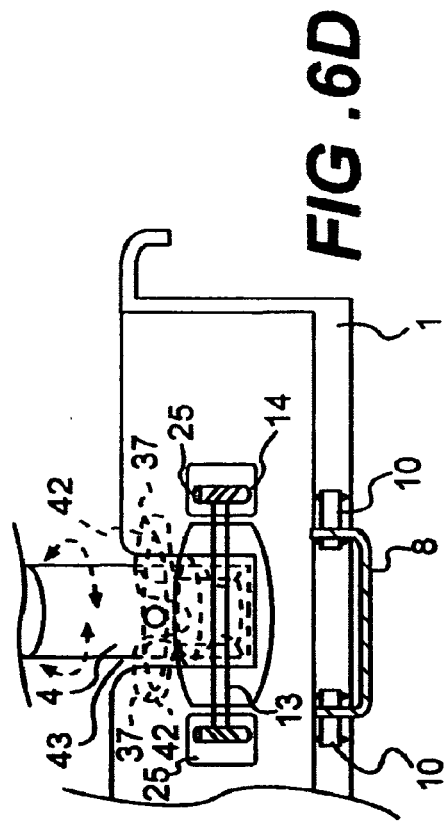
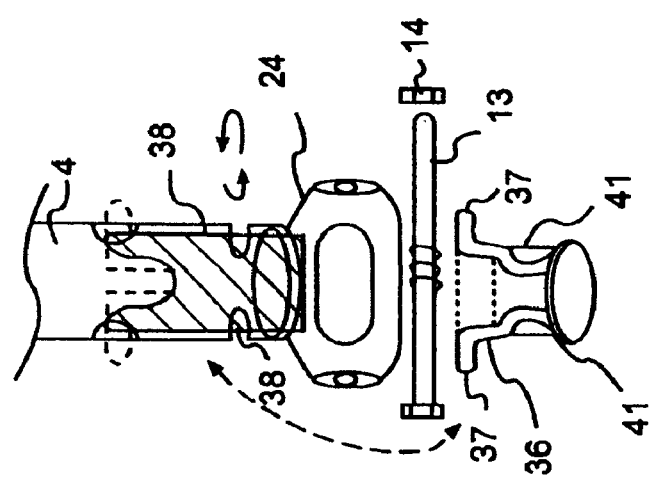

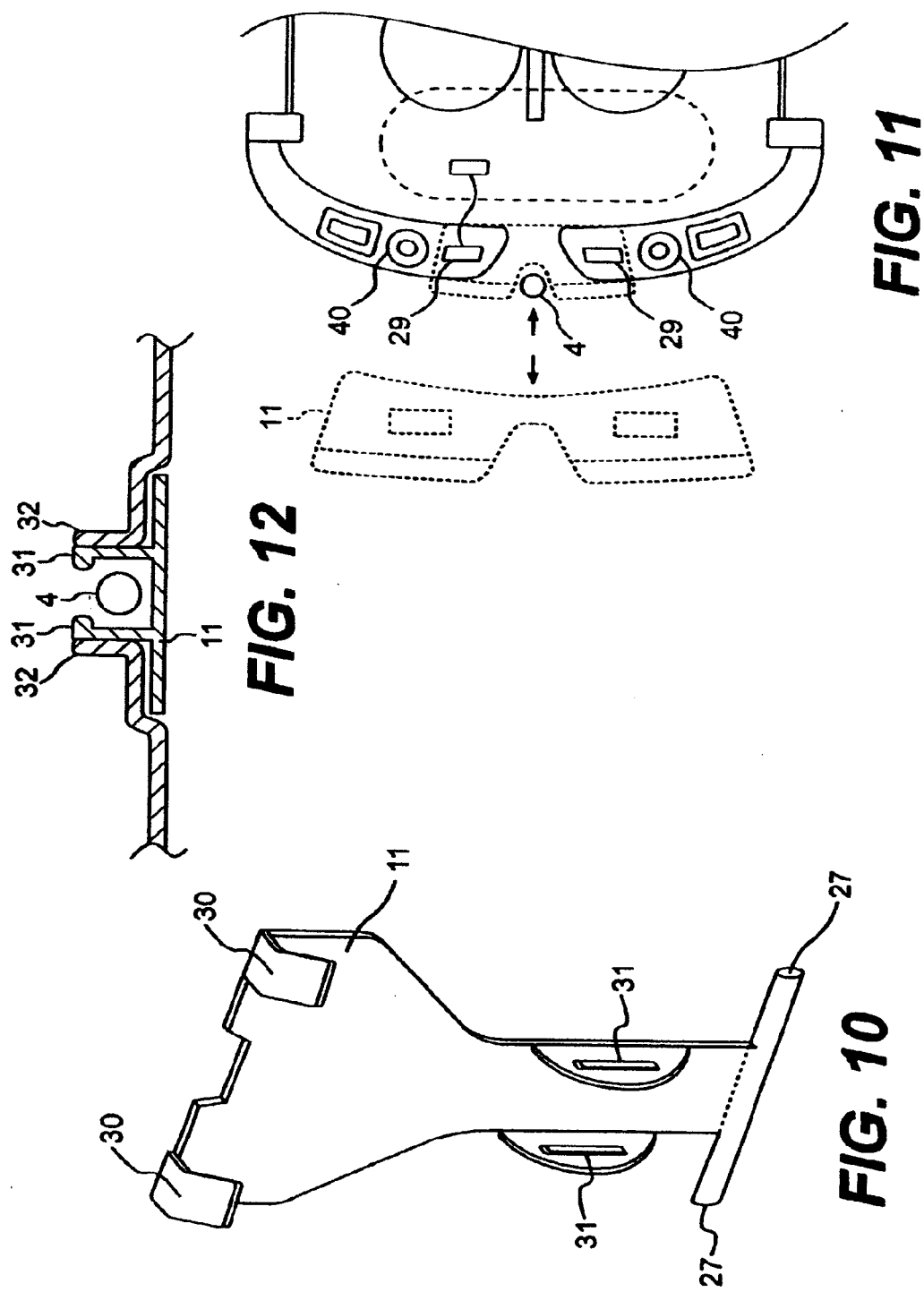

What is claimed is:

1. A wheeled carrier device comprising:

a base member including formed, upwardly projecting stub walls, defining a side elevational profile and an outer perimeter;

at least two wheel assemblies affixed on opposite sides of said carrier device stub walls, each wheel assembly defining four walls substantially perpendicular to the wheel assembly base and a wheel assembly cover, creating both a wheel assembly periphery and an interior cavity; which wheel assembly in the operative position substantially occupies the stub wall horizontal profile and includes at least one outer facing and at least one oppositely oriented inner facing wall and the wheel assembly interior cavity further includes both wheel assembly mounting means and wheel attaching means interconnected to a wheel; and each said wheel assembly and interconnected wheel being movable between a first, latched operative position wherein said wheel is erected to provide rolling support for said carrier device and wherein the plane defined by said wheel assembly and interconnected wheel extends substantially orthogonally to the base member of the carrier device, and a second, stowed, latched position, the plane defined by said wheel assembly and interconnected wheel being swept through an angle during movement of said wheel assemblies between said first and second positions such that the plane defined by the wheel assembly and interconnected wheel in the second position extends substantially parallel with the base member of said carrier device, and said wheel in the second position being disposed within the outer perimeter defined by the carrier device stub walls and in said first operative position the wheel assembly's outer wall substantially melds with the contiguous outer stub wall profile, and in the second, stowed positions of said wheel assembly the outer stub wall profile is interrupted revealing a cavity, and the wheel assembly is at least close to perpendicular to said wheel assembly's first operative position; and said wheel attaching means for the at least one wheel including an elongate wheel support element, including an uppermost portion received by the base of the wheel assembly, entering within the interior cavity of the wheel assembly, said further portion terminating in a second end, and said wheel assembly including a further terminal fixing member cavity therein disposed adjacent to the second end, and said wheel assembly further comprising a terminal fixing member affixed to said second end of said wheel support element and received in said terminal fixing member cavity; and housed substantially within the wheel assembly periphery are transversely disposed, oppositely extending mounting elements, which pass through the wheel assembly periphery and are received in adjacent facing portions of the carrier device stub walls recessed substantially within the thickness of the contiguous stub wall, about which the wheel assembly pivots between the first and second said positions, and at least one latching means which positively latches the wheel assembly against movement when in both the first and second positions is one and the same means, which latch means selectively engages between a portion of the stub wall contiguous to the wheel assembly and a portion of the periphery of the wheel assembly; and a push and pull handle secured to the carrier device, said handle being movable from a first operative position, to a stowed position closely adjacent to the base member, substantially within the side elevational profile and outer perimeter of the carrier device and when occupying the stowed position, at least a part of the handle being positioned within at least one opening formed within a portion of the elongate stub wall, closest to the said handle securing means, which elongate stub wall defines a plane, and said opening has two facing wall portions which are aligned substantially orthogonally to the elongate stub wall plane, retaining means closely proximate to said opening, the retaining means comprising at least one male-female connection between the handle and the walls proximate to said opening for resiliently retaining the handle in at least one further position, in addition to said first operative position, with a retention force which can be overcome by manual movement of said handle.

2. A carrier device in accordance with claim 1, wherein said latching means, which provides latching in both the operative and stowed position, is one and the same means.

3. A carrier device in accordance with claim 1, wherein said manually releasable latching means is integrated into each of said wheel assemblies.

4. A carrier device in accordance with claim 1, wherein said manually releasable latching means is disposed within the side elevational profile of the carrier device.

5. A carrier device in accordance with claim 1, wherein said manually releasable latching means includes at least one spring-biased latch.

6. A carrier device in accordance with claim 1, wherein said manually releasable latching means includes at least one resiliently mounted, manually operated latch member.

7. A carrier device in accordance with claim 1, wherein said wheel assemblies include a wheel support member received between adjacent spaced facing portions of said carrier device, and wherein said latching means includes at least one spring biased latch for, in a latched state, engaging one of said facing portions of said carrier device to latch said wheel support member in place and thus latch the associated wheel assembly in the first, operative position thereof.

8. A carrier device in accordance with claim 1, wherein said latching means include first and second spring-biased latches which each engage recessed portions of the carrier device in the latched state thereof, and finger-activated release means for disengaging said latches from the latched states thereof.

9. A carrier device in accordance with claim 1, wherein a first latch comprises a first latch member and a first biasing spring disposed in a cavity in said wheel assemblies and a second latch comprises a second latch member and a second biasing spring further disposed in a cavity in said wheel assemblies, and portions of said carrier device each including a respective recess in which a respective latch member is received in the latched state thereof.

10. A carrier device in accordance with claim 1, wherein at least part of said handle is positioned within an opening between facing portions of said stub walls, closely adjacent to the base member, substantially within the side elevational profile and outer perimeter of the carrier device; and said handle includes two through bolt holes, in near proximity to to the handle securement end; and wherein said device further comprises: at a handle securement end, a pivot member with a cavity which receives the handle butt end and which member includes a through hole matching the handle through bolt holes; at least two protrusions extending from the carrier device stub walls adjacent to the handle securement position each with at least one inward facing wall, each protrusion including a bolt receiving hole passing through such protrusions; a securing bolt passing through the first of the stub wall protrusion bolt receiving holes, through the pivot member bolt hole, through the bolt holes in said handle, through the other end of the pivot member, and through the second stub wall protrusion hole; and an end cap received on said bolt securing the handle and securement components for the handle to said carrier device.

11. A carrier device in accordance with claim 1, wherein adjacent facing portions of said carrier device include facing cavities therein and at least two of said wheel assemblies include oppositely extending mounting elements which are received in said cavities and about which the associated wheel assembly pivots.

12. A carrier device in accordance with claim 1, wherein transverse extending pivot elements comprise oppositely extending mounting portions of said wheel assembly.

13. A carrier device in accordance with claim 1, wherein said wheel assemblies each includes a spring biased retaining means for retaining said wheel assemblies in the operative position thereof and in the inoperative position thereof, and a movable mounting member to which a respective wheel is affixed, each said retaining means further comprising a resilient male-female connection between said movable mounting member and a fixed member of the carrier device.

14. A carrier device in accordance with claim 1, wherein a formed, selectively removable sleeve is resiliently connected to a portion of the carrier device stub wall, which sleeve at least partly surrounds and selectively retains beverage containers, umbrellas, fishing rods and implements.

15. A carrier device in accordance with claim 1, wherein at least one wheel includes an outer rim and a central hub and said hub including a transverse opening therein, and said wheel assembly for said at least one wheel including a wheel support member, and an elongate wheel support element, said wheel support element including a transverse portion at its first end received in said opening in said hub and forming an axle about which said wheel rotates, and a further portion extending orthogonally to said transverse portion and being received by said wheel assembly, said further portion terminating in a second end, and said wheel assembly including a cavity therein disposed adjacent to the second end, and said wheel assembly further comprising a terminal fixing member affixed to said second end of said wheel support element and received in said cavity, said fixing member being of size and shape relative to that of said cavity so as to prevent rotation thereof in said cavity, whereby axial rotation of said further portion is prevented and thus said at least one wheel is prevented from rotation about said further portion and is limited to rotation about an axis formed by the first portion.

16. A carrier device in accordance with claim 1, wherein two wheels assemblies are mounted on opposite sides of said carrier device, the wheels of said two wheel assemblies, in the second, stowed, position of said two wheel assemblies, being positioned in at least partially overlapping relationship.

17. A carrier device in accordance with claim 1, wherein said latching means includes a pair of oppositely disposed retaining elements and a corresponding pair of finger grips for controlling movement of the latching elements between a retaining position and a release position.

18. A carrier device in accordance with claim 1, wherein at least one of said wheel assemblies includes means for fixating a support axle for the corresponding wheel so as to prevent rotation of the corresponding wheel.

19. A carrier device in accordance with claim 1, wherein at least one of said wheel assemblies includes a wheel axle with an axis defined by a support axle, permitting 360 degree rotation of the corresponding wheel about said axis.

20. A carrier device in accordance with claim 1, wherein said at least one of said wheel assemblies includes a wheel mounting member including a central longitudinal throughhole through which a support shaft axle for the corresponding wheel extends and a recess in one surface thereof in communication with said throughhole, said carrier device further comprising an end cap disposed in said recess and connected to one end of said support shaft, the other end of said support shaft being connected to the corresponding wheel.

21. A carrier device in accordance with claim 1, further comprising a user selectable, manually manipulable means permitting selective fixation of an axle of the wheel of at least one of the wheel assemblies against rotation, as well as selectively permitting 360 degree axial rotation of said wheel.

22. A carrier device in accordance with claim 1, wherein not less than two of said carrier devices nest upon each other when the wheels and handles of said devices are in their stowed positions.

23. A carrier device in accordance with claim 1, wherein at least a portion of the side elevational profile of the outer perimeter of one carrier device base member nests at least partly within at least a portion of the side elevational profile of a contiguous carrier device base member's stub walls when the wheels and handles of said devices are in their stowed positions.

24. A carrier device in accordance with claim 1, wherein not less than two of said carrier devices couple by virtue of interconnectors, each such interconnector being mounted to a respective carrier device, and in the operative position the interconnector coupling is at least partly outside the perimeter of each said device, and one such carrier device handle controls rolling movement of at least two coupled carrier devices.

25. A carrier device in accordance with claim 1, wherein at least one first coupling interconnector is movably mounted to a part of the base member, and in a first operative position is at least close to parallel with the side elevational profile of said base member, where it couples with a second interconnector movably mounted to at least one other carrier device, and the at least one first coupling interconnector is movable to a second stowed position closely adjacent to at least part of the carrier device base member, within the side elevational profile of the carrier device.

26. A carrier device in accordance with claim 1, wherein at least one interconnector, when moved to an operative position, may also serve to allow the carrier device to be hung on a wall by receiving suitable wall hanging means.

27. A carrier device in accordance with claim 1, wherein the handle's securement is at a position at least partly within an opening within the plane of the base member stub walls, and at least a part of the handle is positioned within said opening in said stub walls in the stowed position.

28. A carrier device in accordance with claim 1, wherein the handle is secured to the carrier device at least partly in a plane outside the plane formed by the outer perimeter of the base member stub walls, and at least a part of the handle is positioned within said opening in said stub walls in the stowed position.

29. A carrier device in accordance with claim 1, wherein said push and pull handle is secured to the carrier device at least partly in a plane outside the plane formed by the inner perimeter of the base member stub walls, and at least a part of the handle is positioned within an opening between facing portions of said stub walls to occupy the stowed position, and retaining means are formed from said facing wall portions of the aforesaid stub wall opening, at least near to the plane of said stub walls, immediately adjacent to said opening, and the retaining means comprise at least one male-female connection between the handle and the facing walls such that the retention means cooperate to resiliently retain the handle in at least one position besides the operative position, which resiliently retained position may be overcome by manual movement of said handle.

30. A carrier device in accordance with claim 1, wherein at least part of said handle is positioned within an opening between facing portions of said stub walls, closely adjacent to the base member, substantially within the side elevational profile and outer perimeter of the carrier device; and said device further comprises: an opening within the plane and side elevational profile of said stub walls in near proximity to the handle securement position; an access panel, removably mounted to a portion of the carrier device, in near proximity to the handle securement position; and wherein: said access panel is movable between a first, operative position resiliently and substantially occupying said opening, within the side elevational profile of the device stub walls; said panel is of a shape to substantially emulate the side elevational profile of the adjacent stub walls when occupying said operative position; a second, stowed position of said panel which permits movement of said handle to a stowed handle position at least partly through said stub wall opening and substantially within the side elevational profile of the device; the handle is resiliently retained in at least one non-operative position at least partly by resilient contact with at least one surface of said access panel, when said panel is in the stowed position.

31. A carrier device in accordance with claim 8, wherein said finger actuated release means includes spaced access openings in said wheel assembly and a respective opening in each of said latch members for enabling the latching members to be moved toward each other against the biasing force of said springs to release said latch members from the said recessed portions of said carrier device.

32. A carrier device in accordance with claim 29, wherein the handle securement end includes at least one shaped aspect in near proximity thereto, which at least one shaped aspect causes resilient contact with a least one corresponding shaped area of at least one facing wall of the said stub wall opening.

33. A carrier device in accordance with claim 29, wherein the at least one male resilient connector is a retractable detente, and the manual movement causes the detente to retract, permitting the handle to be moved past the resilient contact between said detente and the at least one facing wall of said stub wall.

34. A carrier device in accordance with claim 29, wherein the manual movement of said handle is partial rotation of the handle, such that the handle shape may occupy a different axis, which permits selective rotation to engage intermediate resilient male-female positioning, and also permits selective further rotation to attain stowed and operative handle positioning.

35. A carrier device in accordance with claim 32, wherein the access panel includes at least one shaped lower extremity movably mounted at least near to the base member, and said panel moves from the first, operative position, to a second, stowed position at least partly within the side elevational profile of the upper edge of the carrier device base member.

36. A carrier device in accordance with claim 32, wherein the access panel, in the first, operative position, includes resilient retaining means, such means comprising a resilient male-female connection between at least part of the access panel and the carrier device stub walls.

37. A carrier device in accordance with claim 32, wherein the access panel, in the first, operative position, includes a shaped portion, which substantially emulates the shape of the adjacent stub wall, and the access panel is resiliently retained to at least a part of said contiguous stub wall.

38. A carrier device in accordance with claim 32, wherein said access panel, when in both the operative and stowed positions, includes means permitting a resilient connection between said handle and said access panel.

39. A carrier device in accordance with claim 32, wherein said access panel, when in both the operative and stowed positions, includes inward facing protrusions which selectively, resiliently retain the handle, and said access panel is also retained in the first, operative position by at least one resilient connection between said carrier device stub walls and the access panel and is further retained in the second, stowed position by at least one resilient connection between said carrier device base member and the access panel.

40. A carrier device in accordance with claim 32, wherein the access panel is moved laterally along the carrier device stub wall between the first, operative position and the second, stowed position.

41. A carrier device in accordance with claim 32, wherein the access panel is moved vertically, away from the direction of the rolling surface, along the carrier device stub wall to the first, operative position and vertically retracted to the second stowed position.

42. A carrier device in accordance with claim 32, wherein said access panel, when in both the operative and stowed positions, includes means permitting a resilient connection between said access panel and said handle.

43. A wheeled carrier device comprising: a base member including formed, upwardly projecting stub walls, defining a side elevational profile and an outer perimeter; at least one wheel assembly affixed to said carrier device, said wheel assembly including a wheel axle and wheel defining a plane, and said wheel assembly being movable between a first, latched operative position wherein said wheel is erected to provide rolling support for said carrier device and wherein the plane defined by the said wheel extends substantially orthogonally to the base member of the carrier device, and a second, stowed, latched position, the plane defined by said wheel being swept through an angle during movement of said wheel assembly between said first and second positions such that the plane defined by said wheel in the second position of said wheel assembly extends substantially parallel with the base member of said carrier device, and said wheel in the second position being disposed substantially within the outer perimeter defined by the carrier device stub walls; each wheel assembly which incorporates the wheel axle is mounted by oppositely extending mounting elements, and in said first operative position the wheel assembly's outer wall substantially melds with the contiguous outer stub wall profile, and in the second, stowed position of said wheel assembly the outer stub wall profile is interrupted revealing a cavity, and the wheel assembly is at least close to perpendicular to said wheel assembly's first operative position; releasable latching means for providing selective retention of said wheel assembly in the first, operative position thereof and in the second, stowed position thereof; a push and pull handle secured to the carrier device, and movable from a first operative position, to a stowed position closely adjacent to the base member, substantially within the side elevational profile and outer perimeter of the carrier device; at least one underside support which is movable from a first, operative position substantially orthogonal to the side elevational profile of the device base, wherein the support affords support between the device base and a rolling surface, to a second, stowed position substantially parallel with the side elevational profile of said carrier device, and being disposed within the outer perimeter defined by the base member, and said handle comprising at least two elongate portions at least partly contained within a handle receiving latitudinal cavity formed from the stub walls of the carrier device; at least one further opening is formed from said handle receiving latitudinal cavity on each of two opposing sides of said stub walls, and handle latching means, movably mounted to the carrier device proximate to said handle receiving latitudinal cavity openings, which interact with a portion of said handle at said openings, and the handle is movable through the handle cavity between the stowed and the operative handle positions, said movably mounted latching means are movable to an operative position wherein the latching means interact with and latch the handle portion at said opening in the stub wall handle cavity to prevent forward and rearward movement of said handle portion in relation to the carrier device, and unlatching of the movable latching means from said latched position permits movement of said handle portion between said operative and stowed handle positions.

44. A carrier device in accordance with claim 43, wherein said latching means comprises a single latching means for providing latching in both the operative and stowed position means.

45. A carrier device in accordance with claim 43, wherein at least one of said wheel assemblies includes releasable means for fixating the position of the corresponding wheel about said axis defined by a support axle for said wheel and for, when released, permitting 360 degree rotation of the corresponding wheel about said axis.

46. A carrier device in accordance with claim 43, further comprising a user selectable, manually manipulable means permitting selective fixation of an axle of the wheel of at least one of the wheel assemblies against rotation, as well as selectively permitting 360 degree axial rotation of said wheel.

47. A carrier device in accordance with claim 43, wherein not less than two of said carrier devices nest upon each other when the wheels and handles of said devices are in their stowed positions.

48. A carrier device in accordance with claim 43, wherein the handle is substantially "U"-shaped.

49. A carrier device in accordance with claim 43, wherein: said handle is substantially "U"-shaped and is at least partly contained within a cavity formed from the stub walls of the carrier device; at least one opening is formed from said cavity which includes a pair of facing walls each including a series of resilient connectors on the facing walls of said opening surrounding the perimeter of the cavity which houses said handle; said resilient connectors correspond with resilient connectors on the at least two outer walls of a rotatable latching ring member, which latching ring is resiliently held between facing walls of said opening; said ring member has rotation limitation due to resilient connectors of the ring contacting corresponding resilient connectors along the aforesaid facing walls; at least one shaped aspect is formed in near proximity to at least one terminal end of the handle; when the handle is moved through the handle cavity between the stowed and the operative position, at least one shaped aspect moves along a correspondingly shaped guide channel formed within the handle cavity, and reaches a terminal position within a specially shaped receiving cavity inside the latching ring; when the shaped aspect of the handle is in its terminal position within the latching ring, the ring may be selectively at least partly rotated to a resiliently latched position retaining said handle against forward and rearward movement in relation to the carrier device, and selectively rotated back to a resiliently maintained release position which permits said handle to be moved to and from the stowed position.

50. A wheeled carrier device according to claim 43, whereby: in near proximity to at least one terminal end of said handle is included at least one manually manipulable member which retracts at least one corresponding detente, which at least one corresponding detente serves to latch and release said handle to a fixed surface of said carrier when it occupies the operative position; the manually manipulable member is accessible through at least one opening in the cavity portion of the base member stub wall housing the handle.

51. A carrier device in accordance with claim 48, wherein at least one stage of the handle is selectively pivotable in relation to at least one other handle stage, to a latched position occupying an angle displaced from the at least one other stage of said handle.

52. A carrier device in accordance with claim 48, wherein in near proximity to one terminal end of the handle is included at least one manually manipulable member which retracts at least one corresponding detente, which at least one corresponding detente serves to latch and release said handle when it occupies the operative position.

53. A carrier device in accordance with claim 49, wherein the manually manipulable member is accessible through at least one opening in the cavity portion of the base member stub wall housing the handle.

54. A wheeled carrier device comprising: a base member including formed, upwardly projecting stub walls, said base member defining a side elevational profile and an outer perimeter defined by the perimeter of the outer face of the stub walls, and defining a second perimeter comprising the inner face of the stub walls; at least three wheels which provide rolling support for the base member of the carrier device; a push and pull handle secured by handle securing means to the carrier device and movable from a first operative position, to a stowed position closely adjacent to the base member substantially within the side elevational profile and outer perimeter of the carrier device; said handle securing means being disposed at least partly in a plane outside the plane formed by the perimeter of the base member stub walls, and when occupying the stowed position, at least a part of the handle being positioned within at least one opening formed within a portion of the elongate stub wall, closest to the handle securing means, which elongate stub wall defines a plane, and said opening has two facing wall portions which are aligned substantially orthogonally to the elongate stub wall plane, retaining means closely proximate to said opening, the retaining means comprising at least one male-female connection between the handle and the walls proximate to said opening for resiliently retaining the handle in at least one further position, in addition to said first operative position, with a retention force which can be overcome by manual movement of said handle.

55. A wheeled carrier device comprising: a base member including formed, upwardly projecting stub walls, defining a side elevational profile and an outer perimeter; at least three wheels which provide rolling support to the base member of the carrier device; a push and pull handle secured to the carrier device in a position outside the plane defined by the inner perimeter of the stub walls of the carrier device, said handle including a butt end nearest to the end secured to the carrier device which is movable from a first operative position, to a stowed position whereby at least part of said handle is positioned within an opening between facing portions of said stub walls, closely adjacent to the base member, substantially within the side elevational profile and outer perimeter of the carrier device; said handle includes two through bolt holes, in near proximity to the handle butt end; at the handle butt end, a pivot member with a cavity which receives the handle butt end and which member includes a through hole matching the handle through bolt holes; at least two protrusions extending from the carrier device stub walls adjacent to the handle securing position each with at least one inward facing wall, each protrusion including a bolt receiving hole passing through such protrusions; a securing bolt passes through the first of the stub wall protrusion bolt receiving holes, through the pivot member bolt hole, through the elongated bolt holes in said handle, through the other end of the pivot member, and through the second stub wall protrusion hole; a terminal fixing member is received on said bolt securing the handle and its securing components to said carrier device.

56. A wheeled carrier device comprising: a base member including formed, upwardly projecting stub walls, defining a side elevational profile and an outer perimeter; at least three wheels which provide rolling support to said base member of the carrier device; a push and pull handle secured to the carrier device in a position outside the plane defined by the inner perimeter of the stub walls of the carrier device, which is also movable from a first operative position, to a stowed position whereby at least part of said handle is positioned within an opening between facing portions of said stub walls, closely adjacent to the base member, substantially within the side elevational profile and outer perimeter of the carrier device; an opening within the plane and side elevational profile of said stub walls in near proximity to the handle securement position; an access covering, removably mounted to a portion of the carrier device, in near proximity to the handle securement position; said access covering is movable between a first, operative position resiliently and substantially occupying said opening, within the side elevational profile of the device stub walls; said covering is of a shape to substantially emulate the side elevational profile of the adjacent stub walls when occupying said operative position; a second, stowed position of said covering which permits movement of said handle to a stowed handle position at least partly through said stub wall opening and substantially within the side elevational profile of the device; the handle is resiliently retained in at least one non-operative position at least partly by resilient contact with at least one surface of the carrier device.

57. A wheeled carrier device comprising: a base member including formed, upwardly projecting stub walls, defining a side elevational profile and an outer perimeter; at least one wheel providing rolling support to said base member of the carrier device; at least one base underside support between the base member and the rolling surface; a push and pull handle secured to the carrier device, which is also movable from a first operative position, to a stowed position, substantially within the side elevational profile and outer perimeter of the carrier device; said handle is substantially "U"-shaped and is at least partly contained within a cavity formed from the stub walls of the carrier device; in near proximity to at least one terminal end of said handle is included at least one manually manipulable member which retracts at least one corresponding detente, which at least one corresponding detente serves to latch and release said handle to a fixed surface of said carrier when it occupies the operative position; the manually manipulable member is accessible through at least one opening in the cavity portion of the base member stub wall housing the handle.

58. A wheeled carrier device comprising: a base member including formed, upwardly projecting stub walls, defining a side elevational profile and an outer perimeter; at least one wheel providing rolling support to said base member of the carrier device; at least one base underside support between the base member and the rolling surface; a push and pull handle secured to the carrier device, which is also movable from a first operative position, to a stowed position closely adjacent to the base member; said handle is substantially "U"-shaped and is at least partly contained within a cavity formed from the stub walls of the carrier device; at least one opening is formed from said cavity which includes a pair of facing walls each including a series of resilient connectors on the facing walls of said opening, surrounding the perimeter of the cavity which houses said handle; said resilient connectors correspond with resilient connectors on the at least two outer walls of a rotatable latching ring member, which latching ring is resiliently held between facing walls of said opening; said ring member has rotation limitation due to resilient connectors of the ring contacting corresponding resilient connectors along the aforesaid facing walls; at least one shaped aspect is formed in near proximity to at least one terminal end of the handle; when the handle is moved through the handle cavity between the stowed and the operative position, the at least one shaped aspect moves along a correspondingly shaped guide channel formed within the handle cavity, and reaches a terminal position within a specially shaped receiving cavity inside the latching ring; when the shaped aspect of the handle is in its terminal position within the latching ring, the ring may be selectively at least partly rotated to a resiliently latched position retaining said handle against forward and rearward movement in relation to the carrier device, and selectively rotated back to a resiliently maintained release position which permits said handle to be moved to and from the stowed position.

59. A wheeled carrier device comprising: a base member including formed, upwardly projecting stub walls, defining a side elevational profile and an outer perimeter; at least one wheel providing rolling support to said base member of the carrier device; at least one base underside support between the base member and the rolling surface; a push and pull handle secured to the carrier device, which is also movable from a first operative position, to a stowed position closely adjacent to the base member substantially within the outer perimeter of said device; said handle comprising at least two elongate portions at least partly contained within a handle receiving latitudinal cavity formed from the stub walls of the carrier device; at least one further opening is formed from said handle receiving latitudinal cavity on each of two opposing sides of said stub walls, and handle latching means, movably mounted to the carrier device proximate to said handle receiving latitudinal cavity openings, which interact with a portion of said handle at said openings, and the handle is movable through the handle cavity between the stowed and the operative handle positions, said movably mounted latching means are movable to an operative position wherein the latching means interact with and latch the handle portion at said opening in the stub wall handle cavity to prevent forward and rearward movement of said handle portion in relation to the carrier device, and unlatching of the movable latching means from said latched position permits movement of said handle portion between said operative and stowed handle positions.

60. A wheeled carrier device comprising: a base member and a plurality of formed, upwardly projecting stub walls, defining a side elevational profile and an outer perimeter; at least one wheel assembly housing defining four walls substantially perpendicular to the housing base and a housing cover, creating both a housing periphery and an interior cavity; which housing in the operative position substantially occupies the stub wall horizontal profile and includes at least one outer facing and at least one oppositely oriented inner facing wall and the housing interior cavity further includes both housing mounting means and wheel attaching means interconnected to a wheel; and said wheel assembly housing and interconnected wheel being movable between a first, latched operative position wherein said wheel is erected to provide rolling support for said carrier device and wherein the plane defined by said wheel assembly housing and interconnected wheel extends substantially orthogonally to the base member of the carrier device, and a second, stowed, latched position, the plane defined by said wheel assembly housing and interconnected wheel being swept through an angle during movement between said first and second positions such that the plane defined by the wheel assembly housing and interconnected wheel in the second position extends substantially parallel with the base member of said carrier device, and said wheel in the second position being disposed within the outer perimeter defined by the carrier device stub walls and in said first operative position the wheel assembly housing's outer wall substantially melds with the contiguous outer stub wall profile, and in the second, stowed position of said wheel assembly housing the outer stub wall profile is interrupted revealing a cavity, and the wheel assembly housing is at least close to perpendicular to said wheel assembly housing's first operative position; and the at least one wheel includes an outer rim and a central hub and said hub including a transverse opening therein, and said wheel attaching means for the at least one wheel including an elongate wheel support element, said wheel support element including a transverse portion at a first end received in said opening in said hub and forming an axle about which said wheel rotates, and a further portion extending orthogonally to said transverse portion and being received by the base of the wheel assembly housing, entering within the interior cavity of the wheel assembly housing, said further portion terminating in a second end, and said wheel assembly housing including a further terminal fixing member cavity therein disposed adjacent to the second end, and said wheel assembly housing further comprising a terminal fixing member affixed to said second end of said wheel support element and received in said terminal fixing member cavity; and housed substantially within the wheel assembly housing periphery are transversely disposed, oppositely extending mounting elements, which pass through the housing periphery and are received in adjacent facing portions of the carrier device stub walls, about which the wheel assembly housing pivots in the first and second positions, and at least one latching means which positively latches the wheel assembly housing against movement when in both the first and second positions is one and the same means, which latch means selectively engages between a portion of the stub wall contiguous to the wheel assembly housing and a portion of the periphery of the wheel assembly housing.

61. A wheeled carrier device comprising: a base member and a plurality of formed, upwardly projecting stub walls, defining a side elevational profile and an outer perimeter; at least one wheel assembly housing defining four walls substantially perpendicular to the housing base and a housing cover, creating both a housing periphery and an interior cavity; which housing in the operative position substantially occupies the stub wall horizontal profile and includes at least one outer facing and at least one oppositely oriented inner facing wall and the housing interior cavity further includes both housing mounting means and wheel attaching means interconnected to a wheel; and said wheel assembly housing and interconnected wheel being movable between a first, latched operative position wherein said wheel is erected to provide rolling support for said carrier device and wherein the plane defined by said wheel assembly housing and interconnected wheel extends substantially orthogonally to the base member of the carrier device, and a second, stowed, latched position, the plane defined by said wheel assembly housing and interconnected wheel being swept through an angle during movement between said first and second positions such that the plane defined by the wheel assembly housing and interconnected wheel in the second position extends substantially parallel with the base member of said carrier device, and said wheel in the second position being disposed within the outer perimeter defined by the carrier device stub walls and in said first operative position the wheel assembly housing's outer wall substantially melds with the contiguous outer stub wall profile, and in the second, stowed position of said wheel assembly housing the outer stub wall profile is interrupted revealing a cavity, and the wheel assembly housing is at least close to perpendicular to said wheel assembly housing's first operative position; and the at least one wheel includes an outer rim and a central hub and said hub including a transverse opening therein, and said wheel attaching means for the at least one wheel including an elongate wheel support element, said wheel support element including a transverse portion at a first end received in said opening in said hub and forming an axle about which said wheel rotates, and a further portion extending orthogonally to said transverse portion and being received by the base of the wheel assembly housing, entering within the interior cavity of the wheel assembly housing, said further portion terminating in a second end, and said wheel assembly housing including a further terminal fixing member cavity therein disposed adjacent to the second end, and said wheel assembly housing further comprising a terminal fixing member affixed to said second end of said wheel support element and received in said terminal fixing member cavity; and housed substantially within the wheel assembly housing periphery are transversely disposed, oppositely extending mounting elements, which pass through the housing periphery and are received in adjacent facing portions of the carrier device stub walls, about which the wheel assembly housing pivots in the first and second positions, and the at least one latching means which positively latches the wheel assembly housing against movement when in both the first and second positions is one and the same means, the said latching means includes at least one spring biased latch for, in a latched state, engaging one of the facing portions of the carrier device stub walls contiguous to said wheel assembly housing, when in the first and second positions; and the latch includes at least one finger actuated latch means mounted substantially within the interior cavity of the housing protruding partly outside the housing periphery, said finger actuated latch accessible through an opening through both the outer and inner facing walls of the wheel assembly housing, for enabling the latching member to be moved against the biasing spring to selectively permit movement of the wheel assembly housing between said first and second positions.

62. A wheeled carrier device comprising: a base member including formed, upwardly projecting stub walls, defining a side elevational profile and an outer perimeter; at least three wheels which provide rolling support to the base member of the carrier device; a rigid, elongate push and pull handle including a formed grasping element, secured to the carrier device in a position outside the plane defined by the inner perimeter of the stub walls of the carrier device, said handle including at least one butt end nearest to the end secured to the carrier device which is also movable from a first operative position, to a stowed position whereby at least part of said handle is positioned within an opening between facing portions of said stub walls, closely adjacent to the base member, substantially within the side elevational profile and outer perimeter of the carrier device; said handle includes at least two through bolt holes, in near proximity to the handle butt end; at least two protrusions extending from the carrier device stub walls adjacent to the handle securing position, each protrusion including a bolt receiving hole passing through such protrusions; a securing bolt passes through the first of the stub wall protrusion bolt receiving holes, through the bolt holes in said handle at least one butt end, and through the at least second stub wall protrusion hole; a terminal fixing member is received on said bolt securing the handle to carrier device, and when occupying the said stowed position, at least a part of the handle being positioned within at least one opening formed within a portion of the elongate stub wall, closest to the handle securing means, which elongate stub wall defines a plane, and said opening has two facing wall portions which are aligned substantially orthogonally to the elongate stub wall plane, retaining means closely proximate to said opening, the retaining means comprising at least one male-female connection between the handle and the walls proximate to said opening for resiliently retaining the handle in at least one further position, in addition to said first operative position, with a retention force which can be overcome by manual movement of said handle.

* * * * *

UNITED STATES PATENT AND TRADEMARK OFFICE
CERTIFICATE OF CORRECTION

PATENT NO.   : 6,893,030 B2  
DATED        : May 17, 2005  
INVENTOR(S)  : Shapiro It is certified that error appears in the above-identified patent and that said Letters Patent is hereby corrected as shown below:

Delete Title page consisting fig 1 with attached new title page consisting fig 1.

Delete Drawing Sheets 1-14 and replace with attached drawings sheets 1-15.

Signed and Sealed this

Eleventh Day of April, 2006

JON W. DUDAS  
*Director of the United States Patent and Trademark Office*

(12) United States Patent  
Shapiro

(10) Patent No.: US 6,893,030 B2  
(45) Date of Patent: May 17, 2005

(54) COMPACT WAGON OR CART INCLUDING STOWABLE WHEELS AND HANDLE

(76) Inventor: Richard N. Shapiro, 2248 Haversham Close, Virginia Beach, VA (US) 23464

(*) Notice: Subject to any disclaimer, the term of this patent is extended or adjusted under 35 U.S.C. 154(b) by 189 days.

(21) Appl. No.: 10/157,980

(22) Filed: May 31, 2002

(65) Prior Publication Data

US 2002/0140190 A1 Oct. 3, 2002

Related U.S. Application Data

(63) Continuation-in-part of application No. 09/604,769, filed on Jun. 28, 2000, now Pat. No. 6,581,945.

(51) Int. Cl.$^7$ ................................................. B62B 3/02
(52) U.S. Cl. ........................................ 280/47.34; 280/651
(58) Field of Search .......................... 280/47.19, 47.26, 280/47.37, 47.371, 35, 30, 37, 40, 651, 655, 655.1, 79.2, 79.4, 646, 47.35, 47.315, 47.11, 47.18, 87.01, 87.05

(56) References Cited

U.S. PATENT DOCUMENTS

| | | | | |
|---|---|---|---|---|
| 263,026 A | * | 8/1882 | Crandall | 280/642 |
| 663,526 A | * | 12/1900 | White | 280/87.01 |
| 832,628 A | * | 10/1906 | Schreffler | 280/652 |
| 836,505 A | * | 11/1906 | Kalli | 280/644 |
| 987,895 A | * | 3/1911 | Long | 280/37 |
| 1,017,983 A | * | 2/1912 | Long | 280/37 |
| 1,024,176 A | * | 4/1912 | Boyens | 280/37 |
| 1,075,372 A | * | 10/1913 | Overshiner | 280/37 |
| 1,076,087 A | * | 10/1913 | Wannenwetsch | 280/37 |
| 1,090,950 A | * | 3/1914 | Spofford et al. | 280/644 |
| 1,125,441 A | * | 1/1915 | Bailey | 280/37 |
| 1,131,559 A | * | 3/1915 | Schrek | 280/37 |
| 1,403,261 A | * | 1/1922 | Lynn | 280/47.26 |
| 1,582,045 A | * | 4/1926 | Don Howe | 280/655.1 |
| 2,350,062 A | | 5/1944 | Mosier | |
| 2,362,186 A | * | 11/1944 | Brantz | 280/650 |
| 2,429,763 A | * | 10/1947 | Lindabury | 280/38 |
| 2,450,373 A | * | 9/1948 | Fiene | 280/649 |
| 2,472,491 A | * | 6/1949 | Quinton | 280/37 |
| 2,545,336 A | * | 3/1951 | Binder | 280/650 |
| 2,555,767 A | * | 6/1951 | Simonian | 220/6 |
| 2,564,266 A | * | 8/1951 | Linton | 280/37 |
| 2,625,407 A | * | 1/1953 | Varner | 280/643 |
| 2,634,791 A | * | 4/1953 | Weirich | 280/7.1 |
| 2,688,493 A | * | 9/1954 | Rosenberg | 280/651 |
| 2,781,225 A | * | 2/1957 | Heideman | 280/642 |
| 2,860,890 A | * | 11/1958 | Oxford et al. | 280/226.1 |
| 2,879,072 A | * | 3/1959 | Rear et al. | 280/40 |
| 2,901,260 A | * | 8/1959 | Lear et al. | 280/29 |
| 2,984,499 A | | 5/1961 | Humphrey | |
| 3,079,162 A | * | 2/1963 | Michels, Jr. | 280/7.1 |
| 3,241,853 A | * | 3/1966 | Pasin | 280/87.01 |
| 3,679,223 A | * | 7/1972 | Sakal | 280/37 |
| 3,883,149 A | * | 5/1975 | Perego | 280/649 |
| 3,944,241 A | * | 3/1976 | Epelbaum | 280/30 |
| 4,109,926 A | | 8/1978 | Lane | |

(Continued)

*Primary Examiner*—Christopher P. Ellis  
*Assistant Examiner*—Bridget Avery

(57) ABSTRACT

Compact carrier devices with stub walls, including wagons, carts and wheelbarrows, are disclosed, which include fixed, stowable and/or pivoting wheels, as well as stowable handles. In various embodiments, simple manually manipulable methods latch each wheel and handle in stowed flat positions within the overall perimeter and profile of the devices, which effectively allows the devices to fold to an ultra flat profile without any wheel or component being detached. Associated innovations include unique nesting methods, both unique center push/pull handles and U shaped handle designs, unique handle access panels, device couplers, simple methods to fixate or allow device wheels/ axles to rotate, as well as snap on accessories which are designed to hold drink containers, fishing rods and implements.

62 Claims, 14 Drawing Sheets

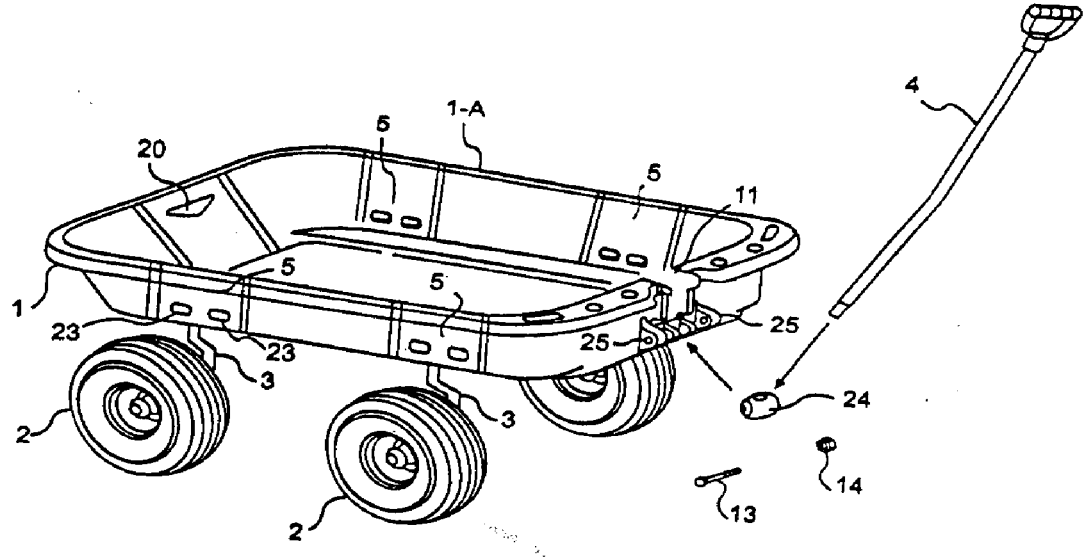

FIG. 1

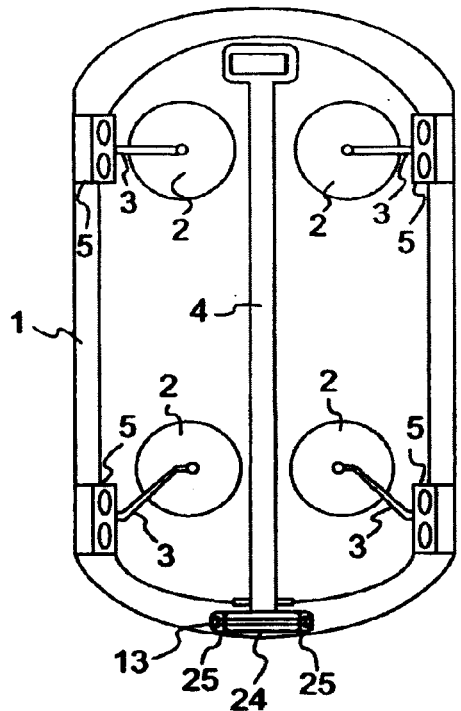
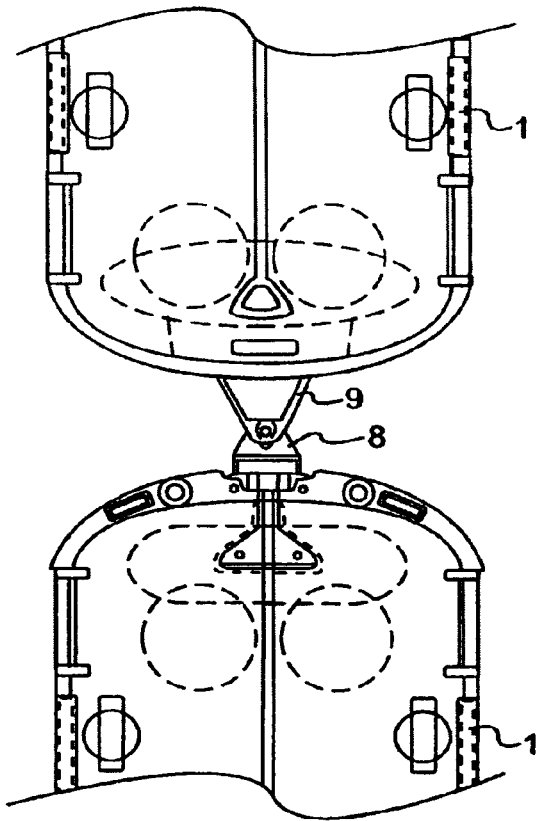
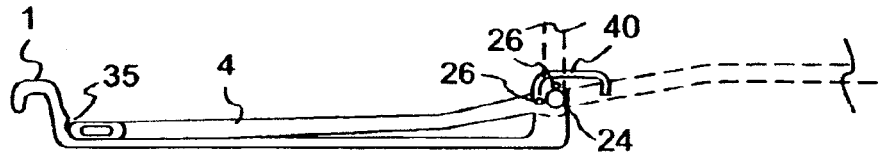
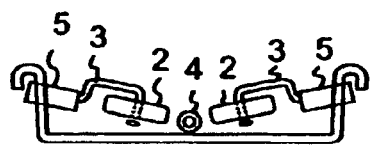
FIG. 4A
FIG. 4
FIG. 5
FIG. 5A